United States Patent
Feng

(10) Patent No.: US 12,289,778 B2
(45) Date of Patent: Apr. 29, 2025

(54) RADIO COMMUNICATION METHOD AND DEVICE

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 619 days.

(21) Appl. No.: 16/066,233

(22) PCT Filed: Mar. 29, 2016

(86) PCT No.: PCT/CN2016/077721
§ 371 (c)(1),
(2) Date: Jun. 26, 2018

(87) PCT Pub. No.: WO2017/166072
PCT Pub. Date: Oct. 5, 2017

(65) Prior Publication Data
US 2020/0015288 A1 Jan. 9, 2020

(51) Int. Cl.
*H04W 76/00* (2018.01)
*H04W 8/08* (2009.01)
(Continued)

(52) U.S. Cl.
CPC ............. *H04W 76/10* (2018.02); *H04W 8/08* (2013.01); *H04W 88/02* (2013.01)

(58) Field of Classification Search
CPC ........ H04W 76/00; H04W 8/00; H04W 36/00
See application file for complete search history.

(56) References Cited

U.S. PATENT DOCUMENTS 7,171,212 B2 1/2007 Kim
2003/0224794 A1 12/2003 Kim
(Continued)

FOREIGN PATENT DOCUMENTS

CN 1791245 A 6/2006
CN 102612021 A 7/2012
(Continued)

OTHER PUBLICATIONS

3GPP TR 23.720v1.1.0 (Oct. 2015), 3rd Generation Partnership Project; Tecnhical Specification Group Services and System Aspects; Architecture enhancements for Cellular Internet of Things (Release13) (Year: 2015).*

(Continued)

*Primary Examiner* — Brandon M Renner
(74) *Attorney, Agent, or Firm* — Ladas & Parry, LLP

(57) ABSTRACT

Provided are a radio communication method and device. The radio communication method comprises: in a first time interval, first network equipment receives a first request message transmitted by terminal equipment and requesting the first network equipment to establish or recover a radio bearer for the terminal equipment; the first network equipment acquires, according to the first request message, context information of the terminal equipment, wherein the context information of the terminal equipment is stored in management equipment, the context information of the terminal equipment is sent to the management equipment and transmitted from a second network equipment to the management equipment, and the second network equipment is the last network equipment generating or updating, before the first interval, the context information of the terminal equipment, and the first network equipment establishes or recovers, according to the context information of the terminal equipment, the radio bearer for the terminal equipment.

(Continued)

The embodiment can reduce required transmission resources and signaling overhead, reducing costs of constructing a network.

6 Claims, 10 Drawing Sheets

(51) Int. Cl.
*H04W 76/10* (2018.01)
*H04W 88/02* (2009.01)

(56) References Cited

U.S. PATENT DOCUMENTS

| | | | |
|---|---|---|---|
| 2011/0116478 A1 | 5/2011 | Zhang | |
| 2011/0216740 A1* | 9/2011 | Yang | H04W 74/0833 370/331 |
| 2012/0077509 A1* | 3/2012 | Huang | H04W 76/19 455/450 |
| 2012/0233635 A1* | 9/2012 | Hakola | H04N 21/61 725/25 |
| 2013/0065595 A1* | 3/2013 | Hu | H04W 36/0033 455/436 |
| 2014/0023045 A1* | 1/2014 | Li | H04W 36/0069 370/331 |
| 2014/0094178 A1* | 4/2014 | Eskicioglu | H04W 36/322 455/440 |
| 2014/0128019 A1* | 5/2014 | Shaikh | H04W 4/029 455/560 |
| 2014/0169299 A1* | 6/2014 | Wang | H04L 5/0096 370/329 |
| 2014/0179325 A1* | 6/2014 | Xu | H04W 36/0033 455/437 |
| 2015/0071251 A1 | 3/2015 | Gupta et al. | |
| 2015/0172981 A1* | 6/2015 | Janakiraman | H04W 24/08 370/241 |
| 2015/0319748 A1* | 11/2015 | Huang | H04W 36/0033 370/329 |
| 2015/0358967 A1 | 12/2015 | Xie et al. | |
| 2016/0057651 A1* | 2/2016 | Backholm | H04W 28/0268 370/235 |
| 2016/0286524 A1* | 9/2016 | Griot | H04W 68/025 |
| 2017/0019945 A1* | 1/2017 | Chiba | H04W 74/0833 |
| 2017/0202051 A1* | 7/2017 | Hwang | H04W 76/19 |
| 2018/0077730 A1* | 3/2018 | Kim | H04W 74/0833 |
| 2018/0352416 A1* | 12/2018 | Ryu | H04W 4/08 |
| 2019/0021128 A1* | 1/2019 | Sivavakeesar | H04W 76/19 |
| 2019/0052435 A1* | 2/2019 | Martin | H04W 76/27 |
| 2020/0015288 A1* | 1/2020 | Feng | H04W 76/19 |

FOREIGN PATENT DOCUMENTS

| | | |
|---|---|---|
| CN | 102740266 A | 10/2012 |
| CN | 103686866 A | 3/2014 |
| CN | 103687055 A | 3/2014 |
| CN | 103782628 A | 5/2014 |
| CN | 104247553 A | 12/2014 |
| CN | 105409288 A | 3/2016 |
| CN | 104247553 B | 7/2019 |
| EP | 1363467 A2 | 11/2003 |
| EP | 2306772 A1 | 4/2011 |
| EP | 2668796 A1 | 12/2013 |

OTHER PUBLICATIONS

Ericsson, "Support of UE mobility for User Plane EPS Optimisation" 3GPP TSG RAN WG3 Meeting #91, R3-160355 (Year: 2016).*
3GPP: "3rd Generation Partnership Project; Technical Specification Group Services and System Aspects; Architecture enhancements for Cellular Internet of Things; (Release 13)", 3GPP TR 23.720.V0.1.0, Jul. 1, 2015 (Jul. 1, 2015), pp. 1-54, XP055365522, Retrieved from the Internet: URL:https://www.3gpp.org/ftp/Specs/archive/23_series/23.720/ [retrieved on Apr. 19, 2017].
Supplementary European Search Report in the European application No. 16895853.6, mailed on Aug. 2, 2019.
English translation of the Written Opinion of the International Search Authority in the international application No. PCT/CN2016/077721, mailed on Dec. 26, 2016.
International Search Report in international application No. PCT/CN2016/077721, mailed on Dec. 26, 2016.
The Written Opinion of the International Search Authority in international application No. PCT/CN2016/077721, mailed on Dec. 26, 2016.
Ericsson, "Support of UE mobility for User Plane EPS Optimisation", 3GPP TSG-RAN WG3#91 R3-160355, Feb. 15, 2016.
NEC, "Lightweight Data Transmission On the User Plane", 3GPP TSG-RAN WG3#91 R3-160269, Feb. 15, 2016.
NTT Docomo, Inc., "RRC Connection Resume at different eNB", 3GPP TSG-RAN WG2#93 R2-161653, Feb. 15, 2016.
First Office Action of the Japanese application No. 2018-537459, issued on Jan. 7, 2020.
First Office Action of the Chinese application No. 201680077144.4, issued on Mar. 10, 2020.
Office Action of the Indian application No. 201817030516, issued on Jun. 11, 2020.
Second Office Action of the Chinese application No. 201680077144.4, issued on Jun. 16, 2020.
Office Action of the Taiwaness application No. 106110448, issued on Jun. 19, 2020.
3rd Generation Partnership Project; Technical Specification Group Radio Access Network; Evolved Universal Terrestrial Radio Access Network (E-UTRAN); S1 Application Protocol (S1AP) (Release 13), 3GPP TS 36.413 V13.1.0 (Dec. 2015).
Third Office Action of the Chinese application No. 201680077144.4, issued on Sep. 14, 2020.
First Office Action of the European application No. 16895853.6, issued on Oct. 6, 2020.
Second Office Action of the European application No. 16895853.6, issued on Dec. 22, 2021.
First Office Action of the Japanese application No. 2020-130310, issued on Oct. 15, 2021.
First Office Action of the Korean application No. 10-2018-7018821, issued on Aug. 5, 2022.

* cited by examiner

RADIO COMMUNICATION METHOD AND DEVICE

RELATED APPLICATION

This application is an application under 35 U.S.C. 371 of International Application No.
PCT/CN2016/077721 filed on Mar. 29, 2016, the entire contents of which are incorporated herein by reference.

TECHNICAL FIELD

The disclosure relates to the field of communications, and more particularly to a method and device for wireless communication.

BACKGROUND

At present, there is such a communication technology that handover between base stations (stations) is required to ensure normal communication of terminal equipment when the terminal equipment moves from a service range of one base station (for example, a source base station) to a service range of the other base station (for example, a target base station). For example, the source base station is required to send a handover request at first to the target base station through a communication link (for example, an X2 link or an X2 interface) between the source base station and the target base station, and after obtaining a feedback of the target base station (that is, the target base station gets ready for handover), may send a handover command to the terminal equipment and send a message containing information of a data packet cache, a data packet cache number or the like (for example, context information) to the target base station. After the terminal equipment accesses the target base station, the target base station may send a path changing request to a core network, for a purpose of notifying the core network to transfer a service of the terminal equipment to the target base station and update a node relationship of a user plane and a control plane, thereby completing handover between the base stations.

However, such a process requires the communication link to be configured between the source base station and the target base station. Moreover, massive signaling communications are required between the source base station and the target base station, which increases transmission resources and signaling overhead as well as network construction cost.

SUMMARY

The disclosure provides a method and device for wireless communication, which may reduce transmission resources and signaling overhead and reduce network construction cost.

A first aspect provides a method for wireless communication, including: first network equipment receives a first request message sent by terminal equipment in a first time period, the first request message being configured to request the first network equipment to set up or resume a radio bearer for the terminal equipment; the first network equipment acquires context information of the terminal equipment according to the first request message, wherein the context information of the terminal equipment may be stored in management equipment, the context information of the terminal equipment may be sent to the management equipment by second network equipment, and the second network equipment may be last network equipment generating or updating the context information of the terminal equipment before the first time period; and the first network equipment sets up or resumes the radio bearer for the terminal equipment according to the context information of the terminal equipment.

In combination with the first aspect, in a first implementation mode of the first aspect, the first request message may be a Radio Resource Control (RRC) connection resume request.

In combination with the first aspect and the abovementioned implementation mode thereof, in a second implementation mode of the first aspect, the operation that the first network equipment acquires the context information of the terminal equipment according to the first request message may include that: the first network equipment sends a second request message to the management equipment according to the first request message, the second request message being configured to request the management equipment to send the context information of the terminal equipment to the first network equipment; and the first network equipment receives the context information of the terminal equipment from the management equipment.

In combination with the first aspect and the abovementioned implementation modes thereof, in a third implementation mode of the first aspect, a mapping relationship between equipment Identifiers (IDs) of terminal equipment and the context information of the terminal equipment may be stored in the management equipment, wherein each of equipment IDs may be configured to uniquely indicate one terminal equipment, and the operation that the first network equipment sends the second request message to the management equipment according to the first request message may include that: the first network equipment sends the second request message containing the equipment ID of the terminal equipment to the management equipment according to the first request message.

In combination with the first aspect and the abovementioned implementation modes thereof, in a fourth implementation mode of the first aspect, before the operation that the first network equipment sends the second request message to the management equipment according to the first request message, the method may further include that: the first network equipment receives first indication information sent by the terminal equipment, the first indication information being configured to indicate third network equipment, or, the first indication information being configured to indicate a first cell, or the first indication information being configured to indicate whether the third network equipment is the same as the first network equipment or not, or the first indication information being configured to indicate whether the first cell is a cell administered by the first network equipment or not, wherein the third network equipment may be last network equipment performing data transmission with the terminal equipment before the first time period, and the first cell may be a cell used for last data transmission of the terminal equipment before the first time period; the first network equipment determines that the third network equipment is different from the first network equipment according to the first indication information; or the first network equipment determines that the first cell is not a cell administered by the first network equipment according to the first indication information.

In combination with the first aspect and the abovementioned implementation modes thereof, in a fifth implementation mode of the first aspect, before the operation that the first network equipment receives the context information of the terminal equipment from the management equipment, the method may further include that: the first network equipment receives second indication information sent by the management equipment, the second indication information being configured to indicate the second network equipment, or, the second indication information being configured to indicate whether the second network equipment is the same as the first network equipment or not; and the first network equipment determines that the second network equipment is different from and the first network equipment according to the second indication information.

In combination with the first aspect and the abovementioned implementation modes thereof, in a sixth implementation mode of the first aspect, the method may further include that: the first network equipment generates or updates the context information of the terminal equipment in a second time period, the second time period being ahead of the first time period; and the first network equipment stores the context information of the terminal equipment.

In combination with the first aspect and the abovementioned implementation modes thereof, in a seventh implementation mode of the first aspect, the method may further include that: the first network equipment receives the first indication information sent by the terminal equipment, the first indication information being configured to indicate the third network equipment, or, the first indication information being configured to indicate the first cell, or the first indication information being configured to indicate whether the third network equipment is the same as the first network equipment or not, or the first indication information being configured to indicate whether the first cell is a cell administered by the first network equipment or not, wherein the third network equipment may be the last network equipment performing data transmission with the terminal equipment before the first time period, the first cell may be the cell used for last data transmission of the terminal equipment before the first time period, and the operation that the first network equipment acquires the context information of the terminal equipment according to the first request message may include that: if the first network equipment determines that the third network equipment is the same as the first network equipment according to the first indication information, the context information, stored by the first network equipment, of the terminal equipment is acquired; or if the first network equipment determines that the first cell is a cell administered by the first network equipment according to the first indication information, the context information, stored by the first network equipment, of the terminal equipment is acquired.

In combination with the first aspect and the abovementioned implementation modes thereof, in an eighth implementation mode of the first aspect, the context information of the terminal equipment may be stored in the management equipment, the context information of the terminal equipment may be sent to the management equipment by the second network equipment, the second network equipment may be the last network equipment generating or updating the context information of the terminal equipment before the first time period, and the operation that the first network equipment acquires the context information of the terminal equipment according to the first request message may include that: the first network equipment receives the second indication information sent by the management equipment, the second indication information being configured to indicate the second network equipment, or, the second indication information being configured to indicate whether the second network equipment is the same as the first network equipment or not; and if the first network equipment determines that the second network equipment is the same as the first network equipment according to the second indication information, the context information, stored by the first network equipment, of the terminal equipment is acquired.

In combination with the first aspect and the abovementioned implementation modes thereof, in a ninth implementation mode of the first aspect, the method may further include that: the first network equipment updates the context information of the terminal equipment in a third time period, the third time period being after the first time period; and the first network equipment sends the updated context information of the terminal equipment to the management equipment.

A second aspect provides a method for wireless communication, which may include that: management equipment receives context information of terminal equipment from second network equipment, the second network equipment being last network equipment generating or updating the context information of the terminal equipment before a first time period, the management equipment receives a second request message sent by first network equipment, the second request message being configured to request the management equipment to transmit the context information of the terminal equipment to the first network equipment, the second request message being sent by the first network equipment according to a first request message received from the terminal equipment in the first time period and the first request message being configured to request the first network equipment to set up or resume a radio bearer for the terminal equipment; and the management equipment sends the context information of the terminal equipment to the first network equipment according to the second request message.

In combination with the second aspect, in a first implementation mode of the second aspect, the operation that the management equipment receives the context information of the terminal equipment from the second network equipment may include that: the management equipment receives the context information of the terminal equipment and an equipment ID of the terminal equipment from the second network equipment, the equipment ID being configured to uniquely the terminal equipment, and the management equipment stores indication information of a mapping relationship between equipment IDs of terminal equipment and context information of the terminal equipment; the operation that the management equipment receives the second request message sent by the first network equipment may include that: the management equipment receives the second request message sent by the first network equipment, the second request message containing the equipment ID of the terminal equipment; and before the operation that the management equipment sends the context information of the terminal equipment to the first network equipment according to the second request message, the method may further include that: the management equipment determines the context information of the terminal equipment according to the equipment ID, contained in the second request message, of the terminal equipment based on the indication information, stored by the management equipment, of the mapping relationship between the equipment IDs of the terminal equipment and the context information of the terminal equipment.

In combination with the second aspect and the abovementioned implementation mode thereof, in a second implementation mode of the second aspect, before the operation that the management equipment sends the context information of the terminal equipment to the first network equipment according to the second request message, the method may further include that: the management equipment sends second indication information to the first network equipment, the second indication information being configured to indicate the second network equipment, or, the second indication information being configured to indicate whether the second network equipment is the same as the first network equipment or not.

In combination with the second aspect and the above-mentioned implementation modes thereof, in a third implementation mode of the second aspect, the method may further include that: the management equipment receives updated context information of the terminal equipment from the first network equipment.

A third aspect provides a method for wireless communication, which may include that: second network equipment generates or updates context information of terminal equipment; and the second network equipment sends the context information of the terminal equipment to management equipment.

In combination with the third aspect, in a first implementation mode of the third aspect, the operation that the second network equipment sends the context information of the terminal equipment to the management equipment may include that: the second network equipment sends the context information of the terminal equipment and an equipment ID of the terminal equipment to the management equipment, wherein an equipment ID may be configured to uniquely indicate the terminal equipment.

A fourth aspect provides a method for wireless communication, which may include that: terminal equipment sends a first request message to first network equipment in a first time period, the first request message being configured to request the first network equipment to set up or resume a radio bearer for the terminal equipment, to enable the first network equipment to acquire context information of the terminal equipment according to the first request message, wherein the context information of the terminal equipment may be stored in management equipment, the context information of the terminal equipment may be sent to the management equipment by second network equipment, and the second network equipment may be last network equipment generating or updating the context information of the terminal equipment before the first time period.

In combination with the fourth aspect, in a first implementation mode of the fourth aspect, the method may further include that: the terminal equipment sends first indication information to the first network equipment, the first indication information being configured to indicate third network equipment, or, the first indication information being configured to indicate a first cell, or the first indication information being configured to indicate whether the third network equipment is the same as the first network equipment or not, or the first indication information being configured to indicate whether the first cell is a cell administered by the first network equipment or not, wherein the third network equipment may be last network equipment performing data transmission with the terminal equipment before the first time period, and the first cell may be a cell used for last data transmission of the terminal equipment before the first time period.

A fifth aspect provides a device for wireless communication, which includes units configured to execute each step in the method in the first aspect and each implementation mode of the first aspect.

A sixth aspect provides a device for wireless communication, which includes units configured to execute each step in the method in the second aspect and each implementation mode of the second aspect.

A seventh aspect provides a device for wireless communication, which includes units configured to execute each step in the method in the third aspect and each implementation mode of the third aspect.

An eight aspect provides a device for wireless communication, which includes units configured to execute each step in the method in the fourth aspect and each implementation mode of the fourth aspect.

A ninth aspect provides device for wireless communication, which includes a memory and a processor. The memory is configured to store a computer program, and the processor is configured to call from the memory and execute the computer program to enable the device for wireless communication to execute any method for wireless communication in the first aspect and various implementation modes thereof.

A tenth aspect provides device for wireless communication, which includes a memory and a processor. The memory is configured to store a computer program, and the processor is configured to call from the memory and execute the computer program to enable the device for wireless communication to execute any method for wireless communication in the second aspect and various implementation modes thereof.

An eleventh aspect provides device for wireless communication, which includes a memory and a processor. The memory is configured to store a computer program, and the processor is configured to call from the memory and execute the computer program to enable the device for wireless communication to execute any method for wireless communication in the third aspect and various implementation modes thereof.

A twelfth aspect provides device for wireless communication, which includes a memory and a processor, the memory is configured to store a computer program, and the processor is configured to call from the memory and execute the computer program to enable the device for wireless communication to execute any method for wireless communication in the fourth aspect and various implementation modes thereof.

A thirteenth aspect provides a computer program product, which includes computer program codes, the computer program codes being operated by a receiving unit, processing unit and sending unit or receiver, processor and sender of network equipment to enable the network equipment to execute any method for wireless communication in the first aspect and various implementation modes thereof.

A fourteenth aspect provides a computer program product, which includes computer program codes, the computer program codes being operated by a receiving unit, processing unit and sending unit or receiver, processor and sender of network equipment to enable management equipment to execute any method for wireless communication in the second aspect and various implementation modes thereof.

A fifteenth aspect provides a computer program product, which includes computer program codes, the computer program codes being operated by a receiving unit, processing unit and sending unit or receiver, processor and sender of network equipment to enable the network equipment to execute any method for wireless communication in the third aspect and various implementation modes thereof.

A sixteenth aspect provides a computer program product, which includes computer program codes, the computer program codes being operated by a receiving unit, processing unit and sending unit or receiver, processor and sender of network equipment to enable terminal equipment to execute any method for wireless communication in the fourth aspect and various implementation modes thereof.

A seventeenth aspect provides a computer-readable storage medium, which stores a program, the program enabling User Equipment (UE) to execute any method for wireless communication in the first aspect and various implementation modes thereof.

An eighteenth aspect provides a computer-readable storage medium, which stores a program, the program enabling network equipment to execute any method for wireless communication in the second aspect and various implementation modes thereof.

A nineteenth aspect provides a computer-readable storage medium, which stores a program, the program enabling UE to execute any method for wireless communication in the third aspect and various implementation modes thereof.

A twentieth aspect provides a computer-readable storage medium, which stores a program, the program enabling network equipment to execute any method for wireless communication in the fourth aspect and various implementation modes thereof.

According to the method and device for wireless communication in the embodiments of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment. That is, when the terminal equipment is required to be handed over from the second network equipment to the first network equipment, signaling interaction between the first network equipment and the second network equipment may be avoided, thereby reducing transmission resources and signaling overhead, and reducing network construction cost.

BRIEF DESCRIPTION OF DRAWINGS

In order to describe the technical solutions of the embodiments of the disclosure more clearly, the drawings required to be used in the embodiments of the disclosure will be simply introduced below. Apparently, the drawings described below are only some embodiments of the disclosure. Other drawings may further be obtained by those of ordinary skilled in the art according to these drawings without creative work.

DETAILED DESCRIPTION

Figure 1:
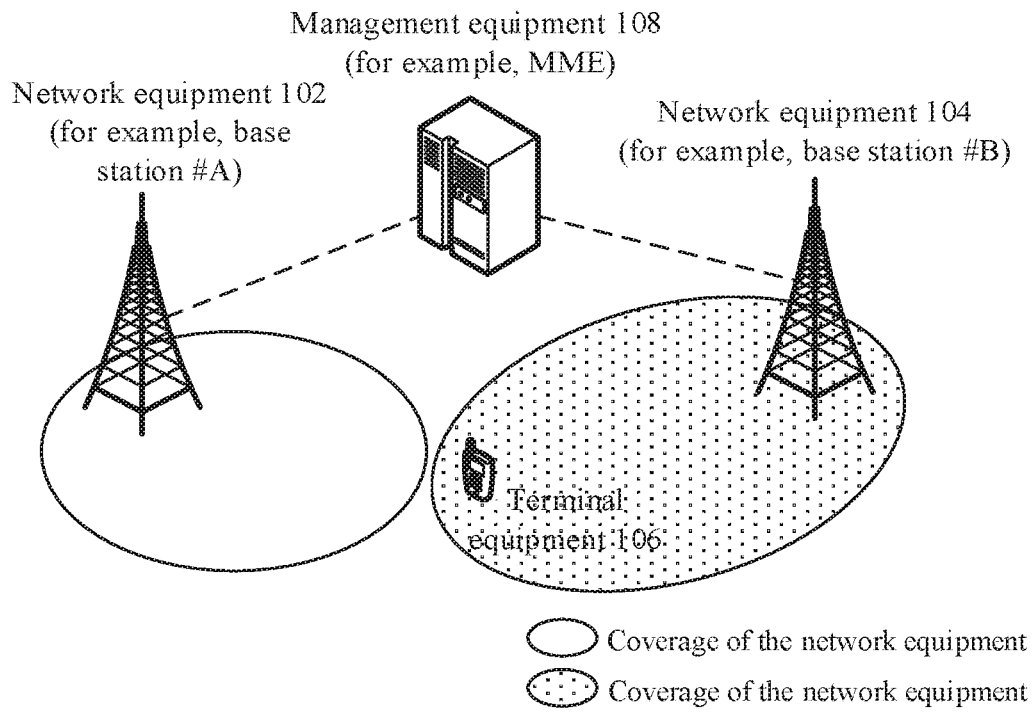
FIG. 1 is a schematic diagram of an example of a communication system to which a method for wireless communication of an embodiment of the disclosure is applicable.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art based on the embodiments in the disclosure without creative work shall fall within the scope of protection of the disclosure.

Terms "part", "module", "system" or the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings show that an application running on computing equipment and the computing equipment may both be parts. One or more parts may reside in a process or an execution thread, and the parts may be located on a computer and/or distributed between two or more computers. In addition, these parts may be executed from various computer-readable media with various data structures stored thereon. Wherein, the "parts" may communicate through local or remote processes according to, for example, signals with one or more data groups, and moreover, the data groups may be, for example, data from two parts interacting with another part of a local system, a distributed system or a network.

The solutions of the embodiments of the disclosure may be applied to an existing cellular communication system, for example, systems of a Global System for Mobile Communication (GSM), Wideband Code Division Multiple Access (WCDMA) and Long Term Evolution (LTE), and supported communication mainly includes voice and data communication. Connections supported by a piece of conventional network equipment are usually limited in number and also easy to implement.

A next-generation mobile communication system will not only support conventional communication but also support Machine to Machine (M2M) communication, or called as Machine Type Communication (MTC). It is predicted that, by 2020, MTC equipment connected to networks will reach 500 to 1,000 hundred million, which will be far larger than an existing connection number. M2M services have greatly different network requirements due to their greatly different service types. There may roughly exist the following requirements:

reliable transmission but insensitivity to delays; and
low delays and high-reliability transmission.

It is easier to process a reliable transmission delay-insensitive service. However, a service of a low-delay and highly-reliable transmission type not only requires a short transmission delay but also requires reliability, for example, a Device to Device (D2D) service. Unreliable transmission may cause retransmission and an excessively long transmission delay and may not meet the requirements.

Existence of a large number of connections makes a future wireless communication system greatly different from an existing communication system. A large number of connections require more resources to be consumed for access of terminal equipment and require more resources to be consumed in transmitting scheduling signaling related to data transmission of the terminal equipment. The solutions according to the embodiments of the disclosure may effectively solve the resource consumption problem.

Each embodiment of the disclosure is described in combination with the terminal equipment. The terminal equipment may also be called as UE, an access terminal, a user unit, a user station, a mobile station, a mobile radio station, a remote station, a remote terminal, mobile equipment, a user terminal, a terminal, a device for wireless communication, a user agent or a user device. The terminal equipment may be an station in a Wireless Local Area Network (WLAN), and may be a cell phone, a cordless phone, a Session Initiation Protocol (SIP) phone, a Wireless Local Loop (WLL) station, a Personal Digital Assistant (PDA), handheld equipment with a wireless communication function, computing equipment, other processing equipment connected to a wireless modem, vehicle-mounted equipment, wearable equipment, terminal equipment in a future 5th-Generation (5G) network, terminal equipment in a future evolved Public Land Mobile Network (PLMN) or the like.

In addition, each embodiment of the disclosure is described in combination with network equipment. The network equipment may be equipment, for example, a base station, configured to communicate with the mobile equipment, and the network equipment may be an Access Point (AP) in the WLAN, a Base Transceiver Station (BTS) in a Global System for Mobile Communication (GSM) or Code Division Multiple Access (CDMA), may also be a NodeB (NB) in WCDMA, and may further be an Evolutional Node B (eNB or eNodeB) in LTE, or a relay station or AP, or vehicle-mounted equipment, wearable equipment, network equipment in the future 5G network, network equipment in the future evolved PLMN or the like.

In the embodiments of the disclosure, management equipment may communicate with each of network equipment (for example, wired communication may be performed and wireless communication may also be performed).

Optionally, the management equipment is a Mobility Management Entity (MME).

Specifically, the MME may exemplarily but unlimitedly be used as the management equipment of the embodiments of the disclosure.

The MME is a key control node of an LTE access network of a 3rd Generation Partnership Project (3GPP) protocol, and it is responsible for positioning and paging processes, including relaying, of the terminal equipment in an idle mode, and briefly, the MME is responsible for a signaling processing part. It involves a bearer activation/disabling process, and when UE is initialized and connected, the MME may select a Serving Gateway (SGW) for the UE. Moreover, the ME may interact with a Home Subscriber Server (HSS) to authenticate a user and allocate a temporary ID to the user. Meanwhile, the MME supports interception and monitoring inside the law.

It should be understood that the functions, listed above, of the MME are only exemplarily described and not intended to limit the disclosure. In the embodiments of the disclosure, the MME may execute various functions of an MME specified by an existing communication protocol. Moreover, the MME is only an example of the management equipment of the embodiments of the disclosure, and any other equipment capable of communicating with the network equipment and with a storage function shall fall within the scope of protection of the disclosure. For example, the management equipment may also be a base station controller.

In addition, each aspect or characteristic of the disclosure may be implemented into a method, a device or a product programmed with a standard and/or using an engineering technology. The term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk, for example, a Compact Disk (CD) and a Digital Versatile Disk (DVD), a smart card and a flash memory, for example, an Erasable Programmable Read-Only Memory (EPROM), a card, a stick or a key driver. In addition, various storage media described in the disclosure may represent one or more equipment and/or other machine-readable media configured to store information. The term "machine-readable medium" may include, but not limited to, a wireless channel and various other media capable of storing, including and/or bearing instructions and/or data.

FIG. 1 is a schematic diagram of a communication system to which a method for wireless communication of the disclosure is applicable. As shown in FIG. 1, the communication system 100 includes network equipment 102 (i.e., an example of first network equipment), network equipment 104 (i.e., an example of second network equipment), terminal equipment 106 and management equipment 108.

Herein, the network equipment (for example, the network equipment 102 or the network equipment 106) may include multiple antennas. In addition, the network equipment may additionally include a transmitter and a receiver. Those ordinary skilled in the art can understand that each of them may include multiple parts (for example, a processor, a modulator, a multiplexer, a demodulator, a demultiplexer or an antenna) related to signal sending and receiving.

The network equipment may communicate with one or more terminal equipment (for example, the terminal equipment 106). However, it can be understood that the network equipment may communicate with any amount of terminal equipment like the terminal equipment. The terminal equipment may be, for example, a cell phone, a smart phone, a portable computer, handheld communication equipment, handheld computing equipment, a satellite radio device, a global positioning system, a PDA and/or any other proper equipment configured for communication in the wireless communication system 100.

Moreover, the network equipment sends information to the terminal equipment through a forward link and receives information from the terminal equipment through a reverse link.

For example, in a Frequency Division Duplex (FDD) system, for example, the forward link may use a frequency band different from that used by the reverse link.

For another example, in a Time Division Duplex (TDD) system and a full duplex system, the forward link and the reverse link may use a common frequency band.

Each antenna (or antenna group formed by multiple antennas) and/or region designed for communication are/is called as sectors/a sector of the network equipment. For example, the antenna group may be designed to communicate with terminal equipment in a sector of coverage area of the network equipment. In a process that the network equipment communicates with the terminal equipment through the forward links 1 respectively, a sending antenna of the network equipment may use beamforming to improve a signal noise ratio of the forward link. In addition, compared with a manner that the network equipment sends signals to all its terminal equipment through a single antenna, mobile equipment in an adjacent cell may be interfered less when the network equipment sends signals to the terminal equipment randomly scattered in the related coverage area by means of beamforming.

In a given time, the network equipment or the terminal equipment may be a wireless communication sending device and/or a wireless communication receiving device. When data is sent, the wireless communication sending device may code the data for transmission. Specifically, the wireless communication sending device may acquire (for example, generation, receiving from another communication device or storage in a memory) a certain number of data bits to be sent to the wireless communication receiving device through a channel. The data bits may be included in a transmission block (or multiple transmission blocks) of the data, and the transmission block may be segmented to generate multiple code blocks.

Moreover, in the embodiments of the disclosure, there is set a communication link between the management equipment 108 and each of network equipment (for example, the network equipment 102 and the network equipment 104) in the communication system, that is, the management equipment 108 may perform information transmission (in a wired manner or a wireless manner) with each of network equipment in the communication system 100.

It is noted that the communication system 100 may be a PLMN or a D2D network or an M2M network or another network. FIG. 1 is only a simplified schematic diagram listed as an example, and the network may further include other network equipment which is not drawn in FIG. 1. In addition, the amounts of the network equipment and terminal equipment in the example shown in FIG. 1 are not intended to limit the disclosure but only for exemplary description.

The method for wireless communication of the embodiments of the disclosure is applicable to a scenario in which terminal equipment moves from coverage of one network equipment to another network equipment (for example, the first network equipment), or, is applicable to a scenario in which serving network equipment for the terminal equipment is required to be changed from one network equipment to another network equipment (for example, the first network equipment).

The method for wireless communication of the embodiments of the disclosure will be described below in detail with a specific process when the terminal equipment moves from coverage of a base station #A to a base station #B (i.e., an example of the first network equipment) as an example or with a specific process when the serving network equipment for the terminal equipment is changed from the base station #A to the base station #B as an example, without loss of generality.

Figure 2:
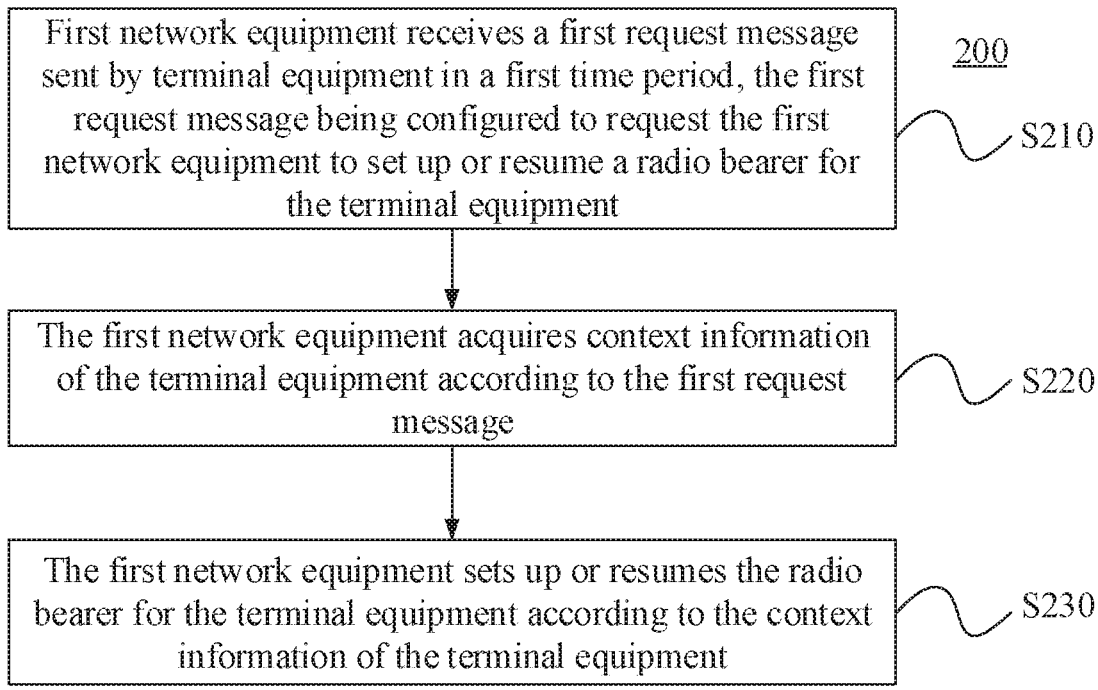
FIG. 2 is a schematic flowchart of a method for wireless communication according to an embodiment of the disclosure.

FIG. 2 is a schematic flowchart of a method for wireless communication described in terms of first network equipment (for example, a base station #B) according to an embodiment of the disclosure. As shown in FIG. 2, the method 200 includes the following operations.

In S210, first network equipment receives a first request message sent by terminal equipment in a first time period, the first request message being configured to request the first network equipment to set up or resume a radio bearer for the terminal equipment.

In S220, the first network equipment acquires context information of the terminal equipment according to the first request message, wherein the context information of the terminal equipment is stored in management equipment, the context information of the terminal equipment is sent to the management equipment by second network equipment, and the second network equipment is last network equipment generating or updating the context information of the terminal equipment before the first time period.

In S230, the first network equipment sets up or resumes the radio bearer for the terminal equipment according to the context information of the terminal equipment.

Specifically, in the embodiment of the disclosure, a processing solution for the condition that terminal equipment #A is required to perform wireless communication through the base station #B (i.e., an example of a first base station) in a time period #A is provided.

Moreover, before the time period #A, the terminal equipment #A has performed wireless communication based on a certain base station in a system, that is, a context of the terminal equipment #A is stored in an MME.

Exemplarily but unlimitedly, the terminal equipment #A is located in coverage of a base station #C after being restarted before the time period #A (namely before the first time period), so that the terminal equipment #A may, for example, access the base station #C through a random access flow. Moreover, when the terminal equipment #A is required to send or receive service data, the terminal equipment #A may initiate a service request process to the base station #C.

For example, when the terminal equipment #A initiates the service request process, a random access process may be initiated at first and, for example, a service request is contained in an RRC connection setup complete message. Such a process is similar to a calling process.

When downlink data arrives, the base station #C may page the terminal equipment #A, and then the terminal equipment #A initiates the random access process and initiates the service request process. Such a process is similar to called access.

An initial context setup process may be implemented by the service request process, an S1 radio bearer is set up on an interface (for example, an S1 interface) between the base station #C and a core network, a data radio bearer is set up on an interface (for example, a Uu interface) between the base station #C and the terminal equipment #A, and a route between UE and the core network is enabled to get ready for subsequent data transmission.

Moreover, in the embodiment of the disclosure, the base station #C may store related information of the radio bearer, i.e., context information of the terminal equipment #A.

For example, when one terminal equipment is in an attachment state or a non-idle state, a context of the terminal equipment may include, for example, a capability (for example, supported communication system) of the terminal equipment, an eNodeB ID, authentication information, a negotiated security algorithm, a generated key, created connection information (for example, an AP Name (APN), a Packet Data Network Gateway (PGW), a Quality of Service Class Identifier (QCI), born information (for example, an Evolved Packet System Bearer ID (EBI), the QCI, an uplink/downlink Aggregate Maximum Bit Rate (AMBR), a Traffic Flow Template (TFT) and control-plane and user-plane addresses) and a configuration of an Access Stratum (AS) of the terminal equipment, for example, a security configuration of the AS, a bearer related configuration and an L1/L2 related configuration.

It should be understood that each cell, listed above, included in the context information is only exemplary description and not intended to limit the disclosure. Other parameters or information belonging to the context in a conventional art all falls within the scope of protection of the disclosure. Moreover, other information useful for resuming the radio bearer of the terminal equipment all falls within the scope of protection of the disclosure.

In addition, after the base station #C generates the context information of the terminal equipment #A, the context information of the terminal equipment #A may be sent to the MME.

Moreover, when a bearer of the terminal equipment #A is changed, the base station #C may update the context information of the terminal equipment #A and may send the updated context information of the terminal equipment #A to the MME.

In the embodiment of the disclosure, the base station #C may be the last base station updating the context information of the terminal equipment #A before the time period #A. For example, before the time period #A, the base station #C serves as a serving base station for the terminal equipment #A all the time, or, the terminal equipment #A may leave the base station #C, and returns to the base station #C before the first time period, and moreover, before the first time period, the last base station updating the context information of the terminal equipment #A is the base station #C.

Or, in the embodiment of the disclosure, before the time period #A, the terminal equipment #A may leave the base station #C and be handed over to other (one or more) base stations. That is, before the first time period, the last base station updating the context information of the terminal equipment #A is a base station (recorded as a base station #D) except the base station #C. Moreover, after each update, the updated context information of the terminal equipment #A is sent to the MME. It is noted that the base station #D may regenerate the context information of the terminal equipment #A and may also acquire the context information, generated or updated by the base station #C, of the terminal equipment #A from the MME. Moreover, when the bearer of the terminal equipment #A is changed, the base station #D may update the context information of the terminal equipment #A and send the updated context information of the terminal equipment #A to the MME.

For convenient understanding and distinction, the last base station updating the context information of the terminal equipment #A before the first time period is recorded as a base station #A (i.e., an example of a second base station) hereinafter. That is, the base station #A may be the base station #C and may also be the base station #D, which will not be specifically limited in the disclosure.

It is noted that, in the embodiment of the disclosure, for one terminal equipment (for example, the terminal equipment #A), the MME may store only one piece of context information. That is, under this condition, only the context information, received last time (or updated last time), of the terminal equipment #A is stored in the MME. That is, in the embodiment of the disclosure, the context information, stored in the MME, of the terminal equipment #A is the context information, generated or updated by the base station #A last time before the time period #A, of the terminal equipment #A.

Therefore, in the time period #A (i.e., an example of the first time period), the base station #B may acquire the context information (recorded as a context #A hereinafter for convenient understanding and distinction), stored in the MME and generated or updated last time before the time period #A, of the terminal equipment #A, set up or resume the radio bearer for the terminal equipment #A based on the context #A and transmit data for the terminal equipment #A through the radio bearer.

A method and process by which the base station #B acquires the context #A will be described below in detail.

In the embodiment of the disclosure, the base station #B may be different from the base station #A (i.e., a first condition), or, the base station #B may be the same as the base station #A (i.e., a second condition). Processing flows under the two conditions will be described below in detail respectively.

The First Condition

Optionally, the operation that the first network equipment acquires the context information of the terminal equipment according to the first request message includes that:

the first network equipment sends a second request message to the management equipment according to the first request message, the second request message being configured to request the management equipment to send the context information of the terminal equipment to the first network equipment; and the first network equipment receives the context information of the terminal equipment from the management equipment.

Figure 3:
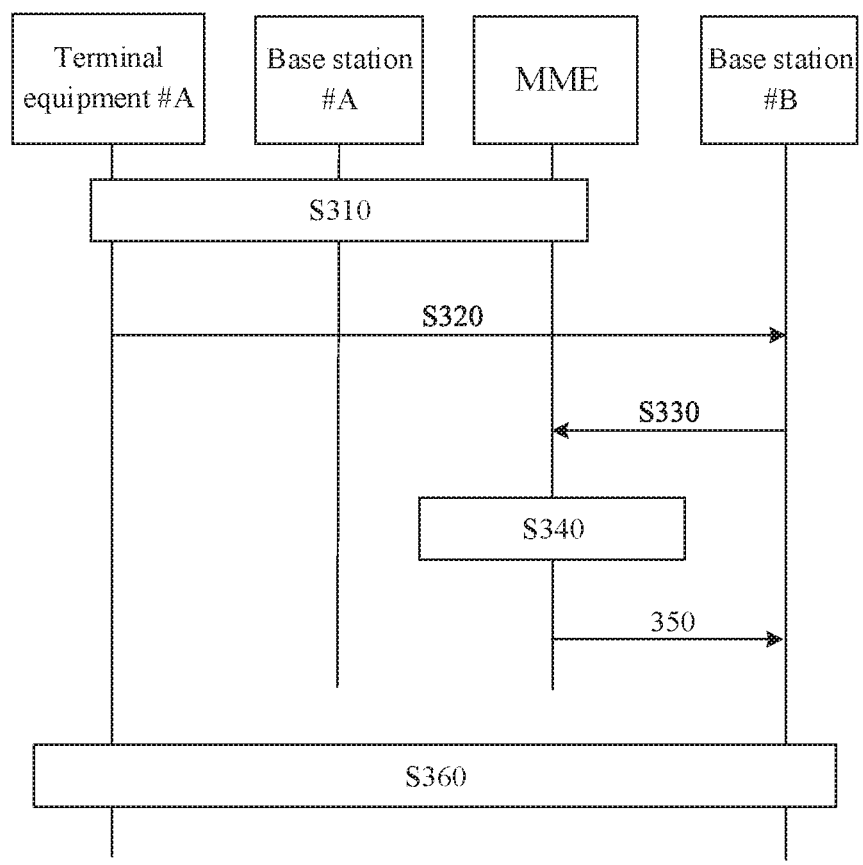
FIG. 3 is an interaction diagram of an example of a method for wireless communication according to an embodiment of the disclosure.

Specifically, FIG. 3 is an interaction diagram of an example of a method for wireless communication according to an embodiment of the disclosure. As shown in FIG. 3, in S310, before the time period #A, the terminal equipment #A is located in the coverage of the base station #A, in addition, the context #A is generated or updated by the base station #A last time before the time period #A, and moreover, the context #A is transmitted to the MME by the base station #A before the time period #A.

In S320, in the time period #A, when the terminal equipment #A moves to the coverage of the base station #B and is required to transmit the data, the terminal equipment

A may send a request message #A (i.e., an example of the first request message) to the base station #B. The request message #A may be a message configured to request the base station #B to transmit the data for the terminal equipment #A. For example, the request message #A may be a message triggering the base station #B to set up (or, resume) the radio bearer for the terminal equipment #A, or, the request message #A may be a message triggering the base station #B to acquire the context #A.

Optionally, the first request message is an RRC connection resume request.

Specifically, in the embodiment of the disclosure, the RRC connection resume request may be used as the request message #A. Therefore, a message in the conventional art may be effectively utilized, and practicability and universality of the method for wireless communication of the embodiment of the disclosure may be improved.

After the request message #A is received, the base station #B may trigger the process of acquiring the context #A.

A process of judging that the base station #B is the same as or different from the base station #A will be described below in detail.

A First Manner

In the embodiment of the disclosure, the process of judging that the base station #B is the same as or different from the base station #A may be implemented based on first indication information from the terminal equipment #A.

That is, optionally, before the operation that the first network equipment sends the second request message to the management equipment according to the first request message, the method further includes that:

the first network equipment receives first indication information sent by the terminal equipment, the first indication information being configured to indicate third network equipment, or, the first indication information being configured to indicate a first cell, or the first indication information being configured to indicate whether the third network equipment is the same as the first network equipment or not, or the first indication information being configured to indicate whether the first cell is a cell administered by the first network equipment or not, wherein the third network equipment is last network equipment performing data transmission with the terminal equipment before the first time period, and the first cell is a cell used for last data transmission of the terminal equipment before the first time period;

the first network equipment determines that the third network equipment is different from the first network equipment according to the first indication information; or the first network equipment determines that the first cell is not a cell administered by the first network equipment according to the first indication information.

Specifically, in the embodiment of the disclosure, the terminal equipment #A may record the network equipment or cell used for last data transmission before a present moment. Therefore, in S320, the terminal equipment #A may contain indication information #1 (i.e., an example of the first indication information) in the request message #A.

Exemplarily but unlimitedly, in the embodiment of the disclosure, the indication information #1 may include the following information.

1: Indication Information of the Base Station (i.e., the Base Station #A) Used for Last Data Transmission Before the Time Period #A, i.e., an ID of the Base Station #A Moreover, under this condition, the base station #B may determine whether the base station #B is the same as the base station #A or not according to the indication information of the base station #A. For example, it may be judged whether an ID of the base station #B is the consistent with the ID of the base station #A or not, if YES, it may be determined that the base station #B is the same as the base station #A, and if NO, it may be determined that the base station #B is different from the base station #A.

2: Indication Information of the Cell (i.e., a Cell of the Base Station #A, Recorded as a Cell #A Hereinafter for Convenient Understanding and Distinction) Used for Last Data Transmission Before the Time #A, for Example, an ID of the Cell #A Moreover, under this condition, the base station #B may determine whether the cell #A is a cell administered by the base station #B or not according to the indication information of the cell #A. For example, it may be judged whether the ID of the cell #A exists in a cell list for recording all cells administered by the base station #B or not, if YES, it may be determined that the base station #B is the same as the base station #A, and if NO, it may be determined that the base station #B is different from the base station #A.

3: Indication Information about Whether the Base Station (i.e., the Base Station #A) Used for Last Data Transmission Before the Time Period #A is the Same as a Base Station (i.e., the Base Station #B) Presently Requested for Service or not Specifically, the terminal equipment #A may acquire information of the base station #B (for example, the ID of the base station #B) and determine whether the base station #B is the same as the base station #A or not (for example, it may be judged whether the ID of the base station #B is consistent with the ID of the base station #A or not) according to the information of the base station #B and stored information of the base station #A, so that 1-bit information may be used as the indication information #1. For example, if the base station #B is the same as the base station #A, the indication information #1 may be "1"; and if the base station #B is different from the base station #A, the indication information #1 may be "0". Therefore, a transmission resource overhead of the indication information #1 may be reduced.

4: Indication Information about Whether the Cell (i.e., the Cell #A) Used for Last Data Transmission Before the Time Period #A is a Cell Administered by the Base Station (i.e., the Base Station #B) Presently Requested for the Service or not Specifically, the terminal equipment #A may acquire information of all the cells administered by the base station #Ba and determine whether the cell #A is a cell administered by the base station #B or not according to the information of all the cells administered by the base station #B and stored information of the cell #A, so that 1-bit information may be used as the indication information #1. For example, if the cell #A is a cell administered by the base station #B, the indication information #1 may be "1"; and if the cell #A is not a cell administered by the base station #B, the indication information #1 may be "0". Therefore, the transmission resource overhead of the indication information #1 may be reduced.

Optionally, the first indication information contains the first request message.

Specifically, in the embodiment of the disclosure, the terminal equipment #A may bear the indication information #1 in the request message #A for sending to the base station #B, so that signaling interaction between the terminal equipment #A and the base station #B may be reduced.

It should be understood that a sending manner, listed above, for the indication information #1 is only exemplarily described and not intended to limit the disclosure. For example, the indication information #1 may also be born in a message except the request message #A, that is, the request message #A and the indication information #1 may not be sent at the same time.

As mentioned above, under the first condition, the base station #B is different from the base station #A, that is, a determination result obtained by the base station #B according to the first manner is that the base station #B is different from the base station #A, so that, in S330, the base station #B may send a request message #B (i.e., an example of the second request message) to the MME, and the request message #B may be a message configured to request the MME to provide the context #A for the base station #B.

In S340, the MME may search for the context #A according to the request message #B. This process will subsequently be described in detail.

In S350, the MME may send the found context #A to the base station #B.

In S360, the base station #B may set up or resume the radio bearer based on the context #A, or, the base station #B may resume the radio bearer used for communication of the terminal equipment #A before the time period #A, so that the terminal equipment #A may perform wireless communication through the base station #B. Here, a process that the base station #B sets up or resumes the radio bearer according to the context #A and transmits the data for the terminal equipment #A may be similar to the conventional art and no more detailed descriptions about it will be made herein to avoid elaborations.

A Second Manner

In the embodiment of the disclosure, the process of determining that the base station #B is the same as or different from the base station #A may be implemented based on second indication information from the MME.

That is, optionally, before the operation that the first network equipment receives the context information of the terminal equipment from the management equipment, the method further includes that:

the first network equipment receives second indication information sent by the management equipment, the second indication information being configured to indicate the second network equipment, or, the second indication information being configured to indicate whether the second network equipment is the same as the first network equipment or not; and the first network equipment determines that the second network equipment and the first network equipment are different network equipment according to the second indication information.

Specifically, in S330, the base station #B may send the request message #B (i.e., an example of the second request message) to the MME, and the request message #B may be a message configured to request the MME to provide the context #A (i.e., the context information, updated last time before the time period #A, of the terminal equipment #A) for the base station #B.

In the embodiment of the disclosure, the MME may record last base stations (including the base station #A) updating context information of terminal equipment (including the terminal equipment #A) served by the MME before the present moment, so that the MME may search for the last base station (i.e., the base station #A) generating or updating the context information of the terminal equipment #A before a time period in which the request message #B is received (namely before the time period #A). Moreover, the MME may send indication information #2 (i.e., an example of the second indication information) to the base station #B.

Exemplarily but unlimitedly, in the embodiment of the disclosure, the indication information #2 may include the following information.

5: The Indication Information of the Last Base Station (i.e., the Base Station #A) Updating the Context Information of the Terminal Equipment #A Before the Time Period #A, i.e., the ID of the Base Station #A Moreover, under this condition, the base station #B may determine whether the base station #B is the same as the base station #A or not according to the indication information of the base station #A. For example, it may be judged whether the ID of the base station #B is the consistent with the ID of the base station #A or not, if YES, it may be determined that the base station #B is the same as the base station #A, and if NO, it may be determined that the base station #B is different from the base station #A.

6: The Indication Information about Whether the Last Base Station (i.e., the Base Station #A) Updating the Context Information of the Terminal Equipment #A Before the Time Period #A is the Same as the Base Station #B or not Specifically, the MME may acquire the information of the base station #B (for example, the ID of the base station #B) and determine whether the base station #B is the same as the base station #A or not (for example, it may be judged whether the ID of the base station #B is consistent with the ID of the base station #A or not) according to the information of the base station #B and the stored information of the base station #A, so that 1-bit information may be used as the indication information #1. For example, if the base station #B is the same as the base station #A, the indication information #1 may be "1"; and if the base station #B is different from the base station #A, the indication information #1 may be "0". Therefore, the transmission resource overhead of the indication information #1 may be reduced.

Optionally, the second indication information and the context information of the terminal equipment are born in the same message.

Specifically, in the embodiment of the disclosure, the MME may bear the indication information #2 and the context #A in the same message for sending to the base station #B, so that signaling interaction between the MME and the base station #B may be reduced.

It should be understood that a sending manner, listed above, for the indication information #2 is only exemplarily described and not intended to limit the disclosure. For example, the indication information #2 and the context #A may also be born in different messages, that is, the indication information #2 and the context #A may not be sent at the same time.

Moreover, as mentioned above, under the first condition, the base station #B is different from the base station #A, that is, a determination result obtained by the MME according to the second manner is that the base station #B is different from the base station #A, so that, in S340, the MME may search for the context #A according to the request message #B. This process will subsequently be described in detail.

In S350, the MME may send the found context #A to the base station #B. Moreover, as mentioned above, under the first condition, the base station #B is different from the base station #A, that is, a determination result obtained by the base station #B according to the second manner is that the base station #B is different from the base station #A, so that the base station #B may receive the context #A.

In S360, the base station #B may set up or resume the radio bearer based on the context #A, or, the base station #B may resume the radio bearer used for communication of the terminal equipment #A before the time period #A, so that the terminal equipment #A may perform wireless communication through the base station #B. Here, the process that the base station #B sets up or resumes the radio bearer according to the context #A and transmits the data for the terminal equipment #A may be similar to the conventional art and no more detailed descriptions about it will be made herein to avoid elaborations.

A process that the MME searches for the context #A will be described below in detail.

Optionally, a mapping relationship between equipment IDs of the terminal equipment and the context information of the terminal equipment is stored in the management equipment, wherein each of the equipment IDs is configured to uniquely indicate one terminal equipment, and the operation that the first network equipment sends the second request message to the management equipment according to the first request message includes that:

the first network equipment sends the second request message containing the equipment ID of the terminal equipment to the management equipment according to the first request message.

Specifically, as mentioned above, each of the base stations in the system may send generated or updated context information to the MME for storage when the context information of terminal equipment served by it is generated or changed, and moreover, when a certain base station requests the MME for context information of a certain terminal equipment, the MME is required to search for the context information of the terminal equipment and sends it to the base station. However, when there are two or more than two pieces of terminal equipment in the system, how to distinguish context information, stored in the MME, of each piece of terminal equipment is a problem required to be solved.

Exemplarily but unlimitedly, in the embodiment of the disclosure, when each of the base stations uploads context information, indication information of terminal equipment (for example, an equipment ID of the terminal equipment) to which the context information belongs may be uploaded at the same time, so that the MME may record a mapping relationship between each piece of context information and the corresponding terminal equipment. For example, when the base station #A sends the context #A to the MME, an equipment ID of the terminal equipment #A may be uploaded to the MME together, so that the MME may record a mapping relationship between the context #A and the equipment ID of the terminal equipment #A. Therefore, when the base station #B requests the MME for the context #A, the equipment ID of the terminal equipment #A may be sent to the MME, and the MME may further find the context information corresponding to the equipment ID of the terminal equipment #A from the recorded mapping relationship as the context #A according to the equipment ID of the terminal equipment #A.

It should be understood that a manner, listed above, for the MME to search for the context corresponding to the terminal equipment is only exemplarily described and not intended to limit the disclosure. For example, when there is less terminal equipment in the system or each of the base stations serves a smaller amount of terminal equipment, the MME may also store a mapping relationship between each piece of context information and base station ID of the base station the context information is from and search for the context information based on the base station IDs.

The Second Condition

Optionally, the method further includes that:

the first network equipment generates or updates the context information of the terminal equipment in a second time period, the second time period being ahead of the first time period; and the first network equipment stores the context information of the terminal equipment.

Figure 4:
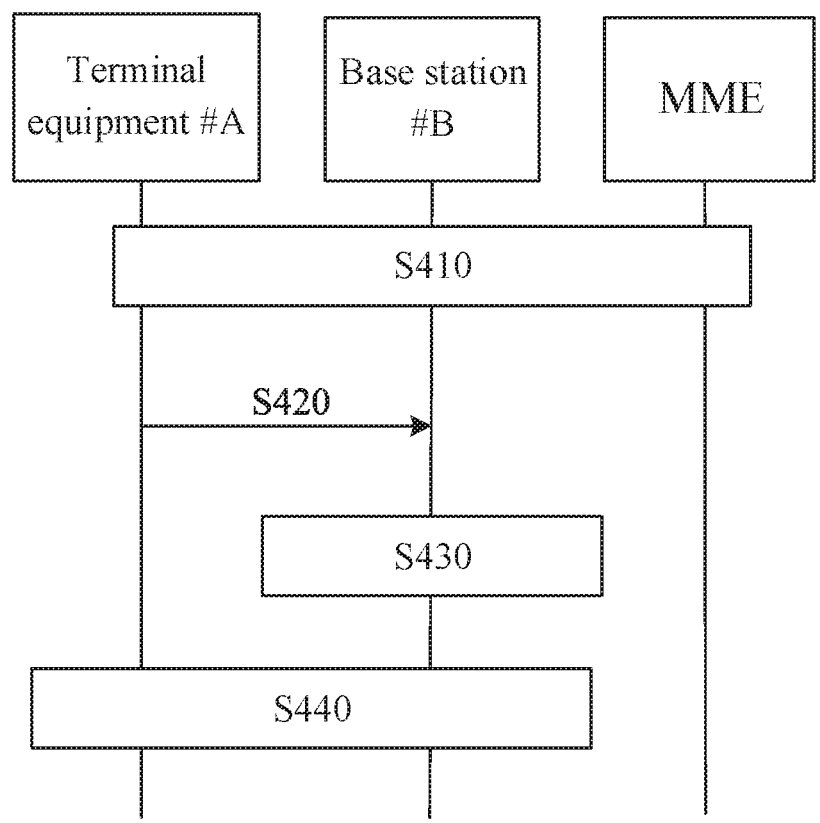
FIG. 4 is an interaction diagram of another example of a method for wireless communication according to an embodiment of the disclosure.

Specifically, FIG. 4 is an interaction diagram of an example of a method for wireless communication according to an embodiment of the disclosure. As shown in FIG. 4, in S410, before the time period #A, the terminal equipment #A is located in the coverage of the base station #B, in addition, the context #A is generated or updated by the base station #B last time before the time period #A, moreover, the context #A is transmitted to the MME by the base station #B before the time period #A, and furthermore, the context #A may be stored in the base station #B.

Moreover, before the time period #A, the terminal equipment #A leaves from the coverage of the base station #B, or, the terminal equipment #A is in a suspended state, or, the terminal equipment #A enters coverage of another base station but the base station does not modify the context of the terminal equipment #A.

In S420, in the time period #A, when the terminal equipment #A moves to the coverage of the base station #B and is required to transmit the data, the terminal equipment #A may send the request message #A (i.e., an example of the first request message) to the base station #B. The request message #A may be a message configured to request the base station #B to transmit the data for the terminal equipment #A. For example, the request message #A may be a message triggering the base station #B to set up (or, resume) the radio bearer for the terminal equipment #A, or, the request #A may be a message triggering the base station #B to acquire the context #A.

Optionally, the first request message is an RRC connection resume request.

Specifically, in the embodiment of the disclosure, the RRC connection resume request may be used as the request message #A. Therefore, the message in the conventional art may be effectively utilized, and the practicability and universality of the method for wireless communication of the embodiment of the disclosure may be improved.

After the request message #A is received, the base station #B may trigger the process of acquiring the context #A.

For example, in S430, the base station #B may determine whether the base station #B is the same as the base station #A or not according to the first manner.

For another example, in S430, the base station #B may determine whether the base station #B is the same as the base station #A or not according to the second manner, that is, the base station #B may send the request message #B (i.e., an example of the second request message) to the MME, and the request message #B may be a message configured to request the MME to provide the context #A (i.e., the context information, updated last time before the time period #A, of the terminal equipment #A) for the base station #B. Moreover, the MME may send the indication information #2 to the base station #B, and the base station #B may determine whether the base station #B is the same as the base station #A or not according to the indication information #2.

Moreover, as mentioned above, under the second condition, the base station #B is the same as the base station #A, and the determination result obtained by the MME according to the second manner is that the base station #B is the same as the base station #A, so that the MME is not required to send the context #A to the base station #B.

Moreover, as mentioned above, under the second condition, the base station #B is the same as the base station #A, and the base station #B may determine that the context #A is stored in the base station #B and acquire the stored context #A. This process will subsequently be described in detail.

In S440, the base station #B may set up or resume the radio bearer based on the context #A, or, the base station #B may resume the radio bearer used for communication of the terminal equipment #A before the time period #A, so that the terminal equipment #A may perform wireless communication through the base station #B. Here, the process that the base station #B sets up or resumes the radio bearer according to the context #A and transmits the data for the terminal equipment #A may be similar to the conventional art and no more detailed descriptions about it will be made herein to avoid elaborations.

A process that the base station #B searches for the context #A will be described below in detail.

In the embodiment of the disclosure, each of the base stations may store indication information of terminal equipment (for example, an equipment ID of the terminal equipment) to which context information belongs at the same time of storing the context information, that is, the base station may record a mapping relationship between each piece of context information and the corresponding terminal equipment. For example, the base station #B may store a mapping relationship between the context #A and the equipment ID of the terminal equipment #A when storing the context #A. Therefore, when searching for the context #A, the base station #B may find the context information corresponding to the equipment ID of the terminal equipment #A from the recorded mapping relationship as the context #A according to the equipment ID of the terminal equipment #A.

It should be understood that a manner, listed above, for the base station to search for the context corresponding to the terminal equipment is only exemplarily described and not intended to limit the disclosure. For example, when there is less terminal equipment in the system or each of the base stations serves a smaller amount of terminal equipment, the base stations may also store the context information only.

Optionally, the method further includes that:

the first network equipment updates the context information of the terminal equipment in a third time period, the third time period being after the first time period; and the first network equipment sends the updated context information of the terminal equipment to the management equipment.

Specifically, after the time period #A (i.e., an example of the third time period), if the base station #B is required to change the context #A, the base station may send the changed context #A to the MME.

Figure 5:
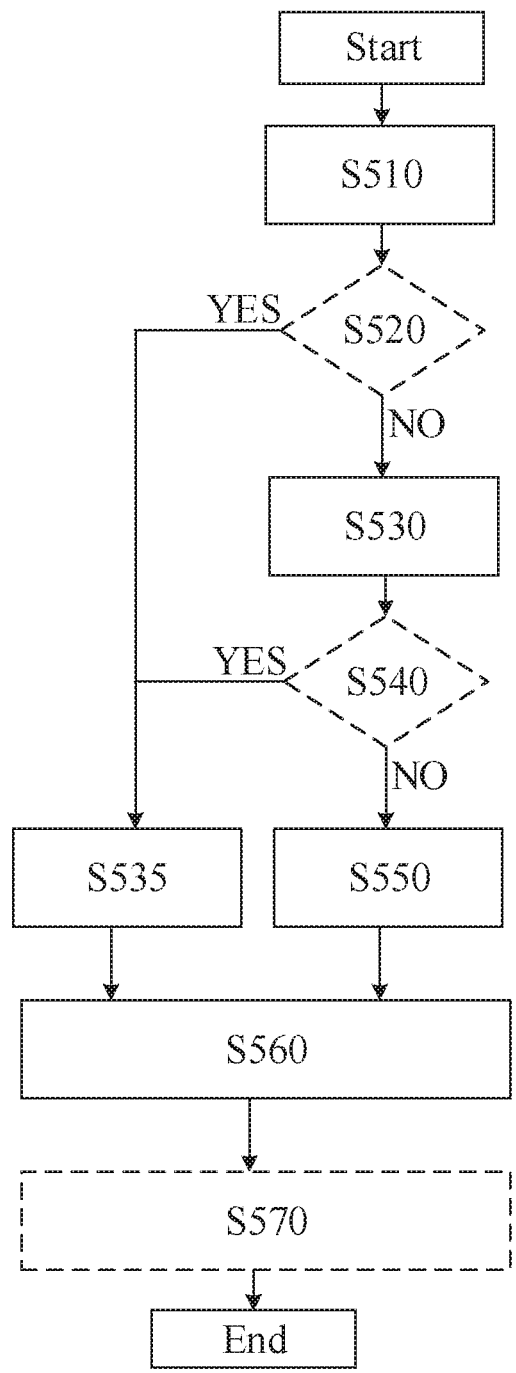
FIG. 5 is a schematic diagram of a processing process of a first base station according to an embodiment of the disclosure.

FIG. 5 is a schematic diagram of a processing process of a first base station according to an embodiment of the disclosure. As shown in FIG. 5, in S510, the base station #B receives the request message #A from the terminal equipment #A in the time period #A.

Optionally, in S520, the base station #B may determine whether the base station #B is the last base station performing data transmission with the terminal equipment #A before the time period #A or not according to the indication information #1 (for example, the indication information #1 may be contained in the request #A) from the terminal equipment #A.

If a determination result in S520 is YES, S535 is executed, and moreover, in S535, the base station #A may search for the stored context #A.

If the determination result in S520 is NO, S530 is executed, and moreover, in S530, the base station #B may send the request message #B to the MME to request for the context #A.

The MME may search for the context #A according to the request message #B and send the found context #A to the base station #B.

Optionally, the MME may send the indication information #2 (for example, the indication information #2 and the context #A may be contained in the same message) to the base station #B.

Moreover, optionally, in S540, the base station #B may determine whether the base station #B is the last base station performing data transmission with the terminal equipment #A before the time period #A or not according to the indication information #2.

If a determination result in S540 is NO, S550 is executed, and moreover, in S550, the base station #B may receive the context #A from the MME.

If the determination result in S540 is YES, S535 is executed.

In S560, the base station #B transmits the data for the terminal equipment #A according to the context #A.

Optionally, in S570, the base station #B may update the context #A and send the updated context #A to the MME.

It is noted that, in the embodiment of the disclosure, the context information transmitted between the network equipment and the MME may be born in a transparent container and may also be transmitted in any other manner, which will not be specifically limited in the disclosure.

According to the method for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment. That is, when the terminal equipment is required to be handed over from the second network equipment to the first network equipment, signaling interaction between the first network equipment and the second network equipment may be avoided, thereby reducing transmission resources and signaling overhead, and reducing network construction cost.

Figure 6:
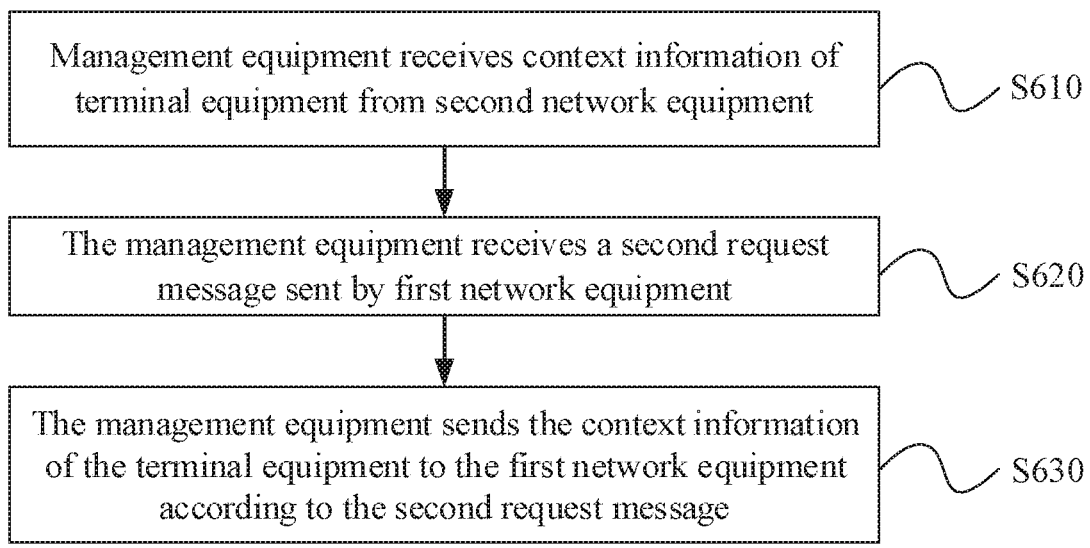
FIG. 6 is a schematic flowchart of a method for wireless communication according to another embodiment of the disclosure.

FIG. 6 is a schematic flowchart of a method for wireless communication 600 described in terms of management equipment according to an embodiment of the disclosure. As shown in FIG. 6, the method 600 includes the following steps.

In S610, the management equipment receives context information of terminal equipment from second network equipment, the second network equipment being last network equipment generating or updating the context information of the terminal equipment before a first time period.

In S620, the management equipment receives a second request message sent by first network equipment, the second request message being configured to request the management equipment to transmit the context information of the terminal equipment to the first network equipment, the second request message being sent by the first network equipment according to a first request message received from the terminal equipment in the first time period and the first request message being configured to request the first network equipment to set up or resume a radio bearer for the terminal equipment.

In S630, the management equipment sends the context information of the terminal equipment to the first network equipment according to the second request message.

Optionally, the operation that the management equipment receives the context information of the terminal equipment from the second network equipment includes that:

the management equipment receives the context information of the terminal equipment and an equipment ID of the terminal equipment from the second network equipment, an equipment ID being configured to uniquely indicate a piece of terminal equipment, and the management equipment stores indication information of a mapping relationship between the equipment ID of the terminal equipment and the context information of the terminal equipment;

the operation that the management equipment receives the second request message sent by the first network equipment includes that:

the management equipment receives the second request message sent by the first network equipment, the second request message containing the equipment ID of the terminal equipment; and before the operation that the management equipment sends the context information of the terminal equipment to the first network equipment according to the second request message, the method further includes that:

the management equipment determines the context information of the terminal equipment according to the equipment ID, contained in the second request message, of the terminal equipment based on the indication information, stored by the management equipment, of the mapping relationship between the equipment ID of the terminal equipment and the context information of the terminal equipment.

Optionally, before the operation that the management equipment sends the context information of the terminal equipment to the first network equipment according to the second request message, the method further includes that:

the management equipment sends second indication information to the first network equipment, the second indication information being configured to indicate the second network equipment, or, the second indication information being configured to indicate whether the second network equipment is the same as the first network equipment or not.

Optionally, the method further includes that:

the management equipment receives updated context information of the terminal equipment from the first network equipment.

The actions of the first network equipment in the method 600 are similar to the actions of the first network equipment (for example, the base station #B) in the method 200, the actions of the management equipment in the method 600 are similar to the actions of the management equipment (for example, the MME) in the method 200, moreover, the actions of the terminal equipment in the method 600 are similar to the actions of the terminal equipment in the method 200, and the actions of the second network equipment in the method 600 are similar to the actions of the second network equipment (for example, the base station #A) in the method 200. No more detailed descriptions about them will be made herein to avoid elaborations.

According to the method for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

Figure 7:
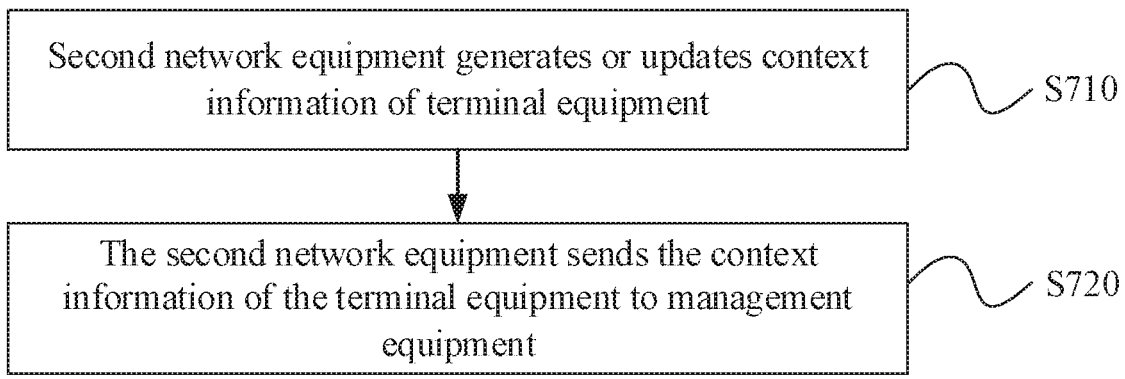
FIG. 7 is a schematic flowchart of a method for wireless communication according to still another embodiment of the disclosure.

FIG. 7 is a schematic flowchart of a method for wireless communication 700 described in terms of second network equipment according to an embodiment of the disclosure. As shown in FIG. 7, the method 700 includes the following steps.

In S710, the second network equipment generates or updates context information of terminal equipment.

In S720, the second network equipment sends the context information of the terminal equipment to management equipment.

Optionally, the operation that the second network equipment sends the context information of the terminal equipment to the management equipment includes that:

the second network equipment sends the context information of the terminal equipment and an equipment ID of the terminal equipment to the management equipment, wherein an equipment ID is configured to uniquely indicate a piece of terminal equipment.

The actions of the first network equipment in the method 700 are similar to the actions of the first network equipment (for example, the base station #B) in the method 200, the actions of the management equipment in the method 700 are similar to the actions of the management equipment (for example, the MME) in the method 200, moreover, the actions of the terminal equipment in the method 700 are similar to the actions of the terminal equipment in the method 200, and the actions of the second network equipment in the method 700 are similar to the actions of the second network equipment (for example, the base station #A) in the method 200. No more detailed descriptions about them will be made herein to avoid elaborations.

According to the method for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

Figure 8:
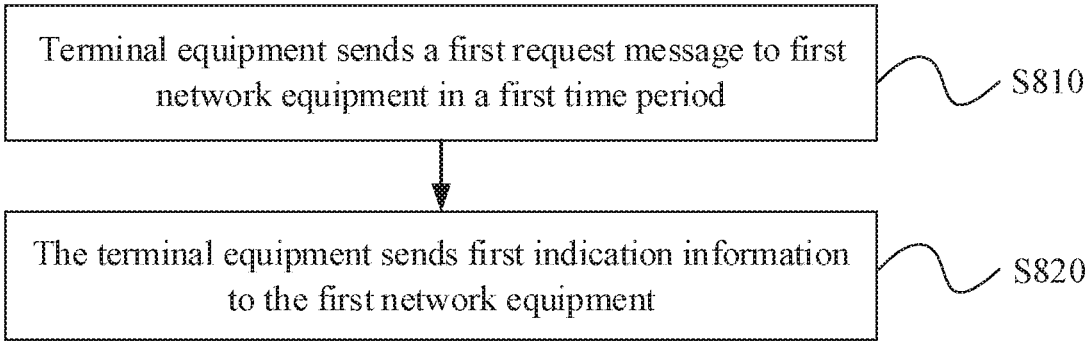
FIG. 8 is a schematic flowchart of a method for wireless communication according to yet another embodiment of the disclosure.

FIG. 8 is a schematic flowchart of a method for wireless communication 800 described in terms of terminal equipment according to an embodiment of the disclosure. As shown in FIG. 8, the method 800 includes the following step.

In S810, the terminal equipment sends a first request message to first network equipment in a first time period, the first request message being configured to request the first network equipment to set up or resume a radio bearer for the terminal equipment, to enable the first network equipment to acquire context information of the terminal equipment according to the first request message, wherein the context information of the terminal equipment is stored in management equipment, the context information of the terminal equipment is sent to the management equipment by second network equipment, and the second network equipment is last network equipment generating or updating the context information of the terminal equipment before the first time period.

Optionally, the method further includes that the following step.

In S820, the terminal equipment sends first indication information to the first network equipment, the first indication information being configured to indicate third network equipment, or, the first indication information being configured to indicate a first cell, or the first indication information being configured to indicate whether the third network equipment is the same as the first network equipment or not, or the first indication information being configured to indicate whether the first cell is a cell administered by the first network equipment or not, wherein the third network equipment is last network equipment performing data transmission with the terminal equipment before the first time period, and the first cell is a cell used for last data transmission of the terminal equipment before the first time period.

The actions of the first network equipment in the method 800 are similar to the actions of the first network equipment (for example, the base station #B) in the method 200, the actions of the management equipment in the method 800 are similar to the actions of the management equipment (for example, the MME) in the method 200, moreover, the actions of the terminal equipment in the method 800 are similar to the actions of the terminal equipment in the method 200, and the actions of the second network equipment in the method 800 are similar to the actions of the second network equipment (for example, the base station #A) in the method 200. No more detailed descriptions about them will be made herein to avoid elaborations.

According to the method for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

The method for wireless communication according to the embodiments of the disclosure is described above in combination with FIG. 1 to FIG. 8 in detail, and a device for wireless communication according to the embodiments of the disclosure will be described below in combination with FIG. 9 and FIG. 12 in detail.

Figure 9:
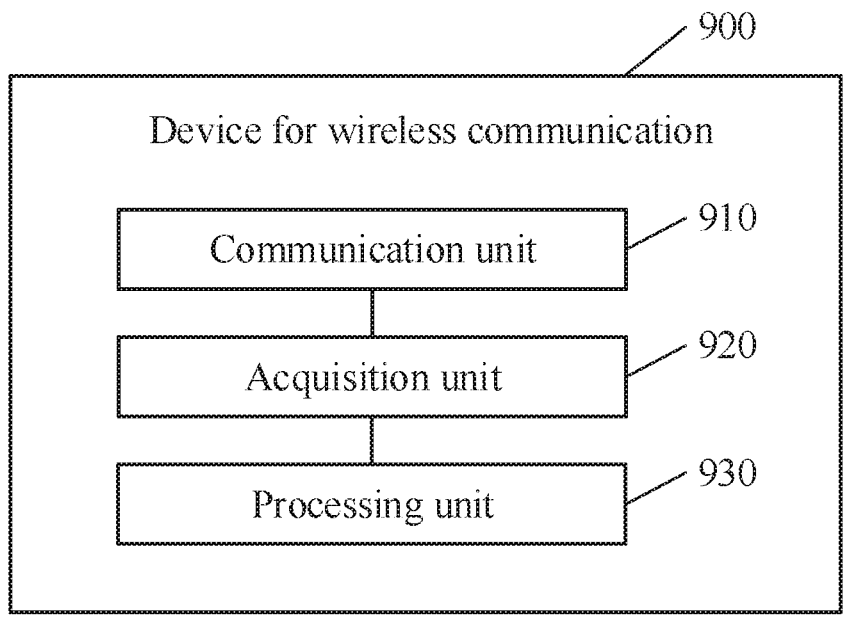
FIG. 9 is a schematic block diagram of a device for wireless communication according to an embodiment of the disclosure.

FIG. 9 is a schematic block diagram of a device for wireless communication 900 according to an embodiment of the disclosure. As shown in FIG. 9, the device 900 includes:

a communication unit 910, configured to receive a first request message sent by terminal equipment in a first time period, the first request message being configured to request the device to set up or resume a radio bearer for the terminal equipment;

an acquisition unit 920, configured to acquire context information of the terminal equipment according to the first request message, wherein the context information of the terminal equipment is stored in management equipment, the context information of the terminal equipment is sent to the management equipment by second network equipment, and the second network equipment is last network equipment generating or updating the context information of the terminal equipment before the first time period, and a processing unit 930, configured to set up or resume the radio bearer for the terminal equipment according to the context information of the terminal equipment.

Optionally, the first request message is an RRC connection resume request.

Optionally, the acquisition unit is specifically configured to control the communication unit to send a second request message to the management equipment according to the first request message, the second request message being configured to request the management equipment to send the context information of the terminal equipment to the device, and is configured to control the communication unit to receive the context information of the terminal equipment from the management equipment.

Optionally, a mapping relationship between an equipment ID of the terminal equipment and the context information of the terminal equipment is stored in the management equipment, wherein an equipment ID is configured to uniquely indicate a piece of terminal equipment, and the acquisition unit is specifically configured to control the communication unit to send the second request message to the management equipment according to the first request message, the second request message containing the equipment ID of the terminal equipment.

Optionally, the communication unit is further configured to receive first indication information sent by the terminal equipment, the first indication information being configured to indicate third network equipment, or, the first indication information being configured to indicate a first cell, or the first indication information being configured to indicate whether the third network equipment is the same as the device or not, or the first indication information being configured to indicate whether the first cell is a cell administered by the device or not, wherein the third network equipment is last network equipment performing data transmission with the terminal equipment before the first time period, and the first cell is a cell used for last data transmission of the terminal equipment before the first time period; the acquisition unit is further configured to determine that the third network equipment and the device are different network equipment according to the first indication information; or the acquisition unit is further configured to determine that the first cell is not a cell administered by the device according to the first indication information.

Optionally, the communication unit is further configured to receive second indication information sent by the management equipment, the second indication information being configured to indicate the second network equipment, or, the second indication information being configured to indicate whether the second network equipment is the same as the device or not; and the acquisition unit is further configured to determine that the second network equipment and the device are different network equipment according to the second indication information.

Optionally, the processing unit is further configured to generate or update the context information of the terminal equipment in a second time period, the second time period being ahead of the first time period; and the device further includes: a storage unit 940, configured to store the context information of the terminal equipment.

Optionally, the communication unit is further configured to receive the first indication information sent by the terminal equipment, the first indication information being configured to indicate the third network equipment, or, the first indication information being configured to indicate the first cell, or the first indication information being configured to indicate whether the third network equipment is the same as the device or not, or the first indication information being configured to indicate whether the first cell is a cell administered by the device or not, wherein the third network equipment is the last network equipment performing data transmission with the terminal equipment before the first time period, the first cell is the cell used for last data transmission of the terminal equipment before the first time period, and the acquisition unit is specifically configured to, if it is determined that the third network equipment and the device are the same network equipment according to the first indication information, acquire the context information of the terminal equipment from the storage unit; or the acquisition unit is specifically configured to, if it is determined that the first cell is a cell administered by the device according to the first indication information, acquire the context information of the terminal equipment from the storage unit.

Optionally, the context information of the terminal equipment is stored in the management equipment, the context information of the terminal equipment is sent to the management equipment by the second network equipment, the second network equipment is the last network equipment generating or updating the context information of the terminal equipment before the first time period, and the communication unit is further configured to receive the second indication information sent by the management equipment, the second indication information being configured to indicate the second network equipment, or, the second indication information being configured to indicate whether the second network equipment is the same as the device or not; and the acquisition unit is specifically configured to, if it is determined that the second network equipment and the device are the same network equipment according to the second indication information, acquire the context information of the terminal equipment from the storage unit.

Optionally, the processing unit is further configured to update the context information of the terminal equipment in a third time period, the third time period being located after the first time period; and the communication unit is further configured to send the updated context information of the terminal equipment to the management equipment.

The device for wireless communication 900 according to the embodiment of the disclosure may correspond to the first network equipment (for example, the base station #B) in the method of the embodiments of the disclosure, and moreover, each unit, i.e., module, in the device for wireless communication 900 and the abovementioned and other operations and/or functions are adopted to implement the corresponding flows in the method 200 in FIG. 2 and will not be elaborated herein for simplicity.

According to the device for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

Figure 10:
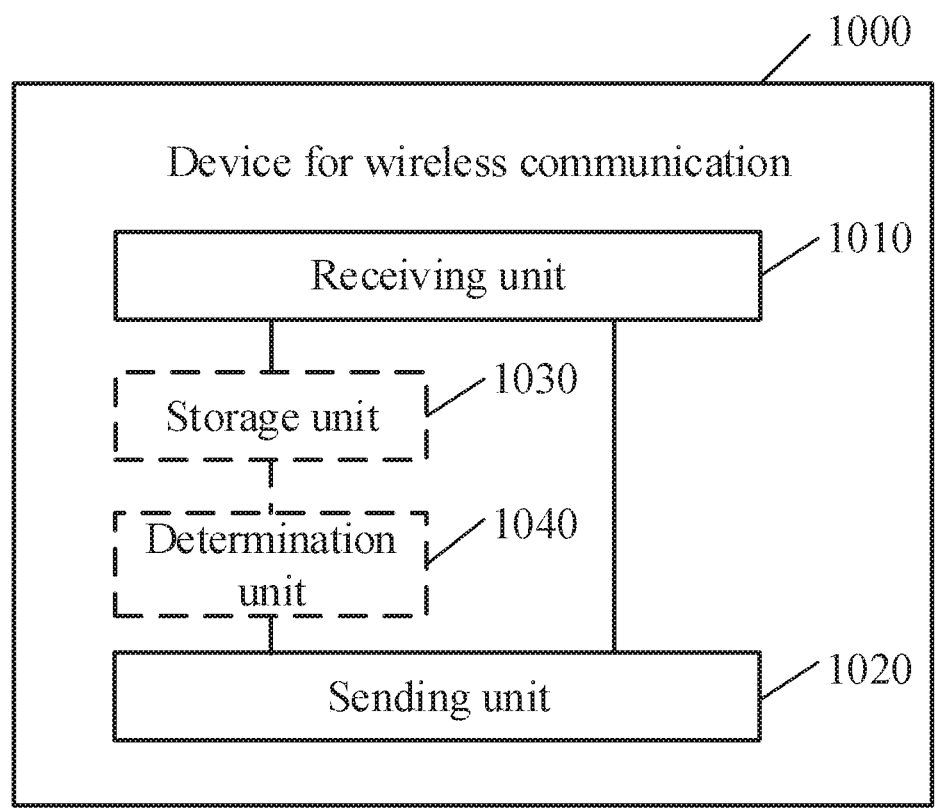
FIG. 10 is a schematic block diagram of a device for wireless communication according to another embodiment of the disclosure.

FIG. 10 is a schematic block diagram of a device for wireless communication 1000 according to another embodiment of the disclosure. As shown in FIG. 10, the device 1000 includes:

a receiving unit 1010, configured to receive context information of terminal equipment from second network equipment, the second network equipment being last network equipment generating or updating the context information of the terminal equipment before a first time period, the receiving unit being further configured to receive a second request message sent by first network equipment, the second request message being configured to request the device to transmit the context information of the terminal equipment to the first network equipment, the second request message being sent by the first network equipment according to a first request message received from the terminal equipment in the first time period and the first request message being configured to request the first network equipment to set up or resume a radio bearer for the terminal equipment; and a sending unit 1020, configured to send the context information of the terminal equipment to the first network equipment according to the second request message.

Optionally, the receiving unit is specifically configured to receive the context information of the terminal equipment and an equipment ID of the terminal equipment from the second network equipment, an equipment ID being configured to uniquely indicate a piece of terminal equipment, and the device further includes:

a storage unit 1030, configured to store indication information of a mapping relationship between the equipment ID of the terminal equipment and the context information of the terminal equipment;

the receiving unit is specifically configured to receive the second request message sent by the first network equipment, the second request message containing the equipment ID of the terminal equipment; and the device further includes:

a determination unit 1040, configured to determine the context information of the terminal equipment according to the equipment ID, contained in the second request message, of the terminal equipment based on the indication information, stored by the device, of the mapping relationship between the equipment ID of the terminal equipment and the context information of the terminal equipment.

Optionally, the sending unit is further configured to send second indication information to the first network equipment, the second indication information being configured to indicate the second network equipment, or, the second indication information being configured to indicate whether the second network equipment is the same as the first network equipment or not.

Optionally, the receiving unit is further configured to receive updated context information of the terminal equipment from the first network equipment.

The device for wireless communication 1000 according to the embodiment of the disclosure may correspond to the management equipment (for example, the MME) in the method of the embodiments of the disclosure, and moreover, each unit, i.e., module, in the device for wireless communication 1000 and the abovementioned and other operations and/or functions are adopted to implement the corresponding flows in the method 600 in FIG. 6 and will not be elaborated herein for simplicity.

According to the device for wireless communication of the embodiment of the disclosure, the second network equipment sends the context information of the terminal equipment to the device after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

Figure 11:
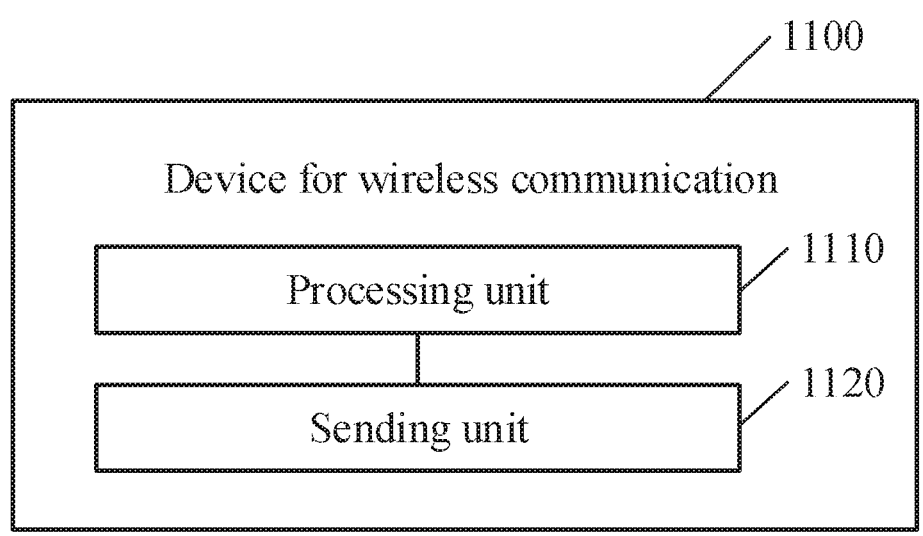
FIG. 11 is a schematic block diagram of a device for wireless communication according to still another embodiment of the disclosure.

FIG. 11 is a schematic block diagram of a device for wireless communication 1100 according to another embodiment of the disclosure. As shown in FIG. 11, the device 1100 includes:

a processing unit 1110, configured to perform negotiation processing with terminal equipment to generate or update context information of the terminal equipment; and a sending unit 1120, configured to send the context information of the terminal equipment to management equipment.

Optionally, the sending unit is specifically configured to send the context information of the terminal equipment and an equipment ID of the terminal equipment to the management equipment, wherein an equipment ID is configured to uniquely indicate a piece of terminal equipment.

The device for wireless communication 1100 according to the embodiment of the disclosure may correspond to the second network equipment (for example, the network equipment #A) in the method of the embodiments of the disclosure, and moreover, each unit, i.e., module, in the device for wireless communication 1100 and the abovementioned and other operations and/or functions are adopted to implement the corresponding flows in the method 700 in FIG. 7 and will not be elaborated herein for simplicity.

According to the device for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

Figure 12:
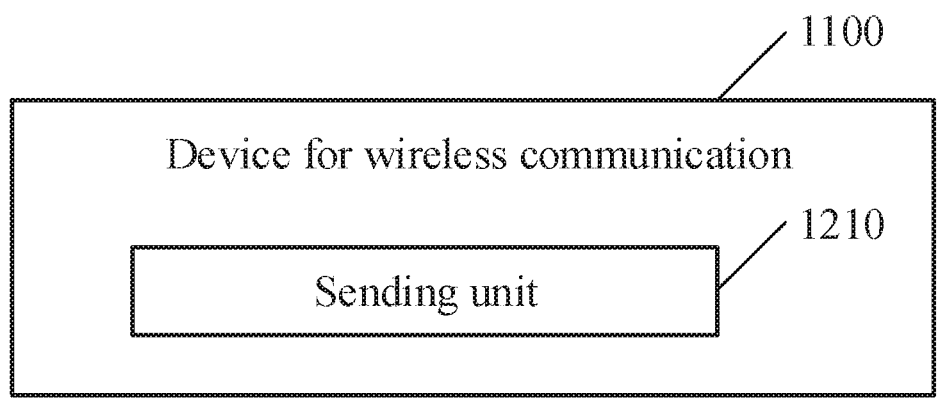
FIG. 12 is a schematic block diagram of a device for wireless communication according to yet another embodiment of the disclosure.

FIG. 12 is a schematic block diagram of a device for wireless communication 1200 according to another embodiment of the disclosure. As shown in FIG. 12, the device 1200 includes:

a sending unit 1210, configured to send a first request message to first network equipment in a first time period, the first request message being configured to request the first network equipment to set up or resume a radio bearer for the device, to enable the first network equipment to acquire context information of the device according to the first request message, wherein the context information of the device is stored in management equipment, the context information of the device is sent to the management equipment by second network equipment, and the second network equipment is last network equipment generating or updating the context information of the device before the first time period.

Optionally, the sending unit is further configured to send first indication information to the first network equipment, the first indication information being configured to indicate third network equipment, or, the first indication information being configured to indicate a first cell, or the first indication information being configured to indicate whether the third network equipment is the same as the first network equipment or not, or the first indication information being configured to indicate whether the first cell is a cell administered by the first network equipment or not, wherein the third network equipment is last network equipment performing data transmission with the device before the first time period, and the first cell is a cell used for last data transmission of the terminal equipment before the first time period.

The device for wireless communication 1200 according to the embodiment of the disclosure may correspond to the terminal equipment (for example, the terminal equipment #A) in the method of the embodiments of the disclosure, and moreover, each unit, i.e., module, in the device for wireless communication 1200 and the abovementioned and other operations and/or functions are adopted to implement the corresponding flows in the method 800 in FIG. 8 and will not be elaborated herein for simplicity.

According to the device for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

The method for wireless communication according to the embodiments of the disclosure is described above in combination with FIG. 1 to FIG. 8 in detail, and device for wireless communication according to the embodiments of the disclosure will be described below in combination with FIG. 13 and FIG. 16 in detail.

Figure 13:
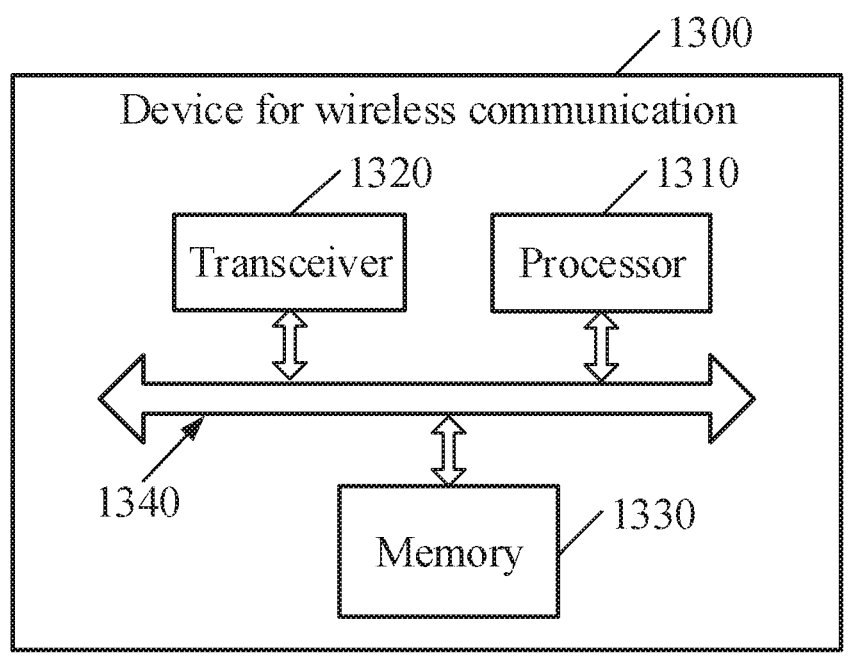
FIG. 13 is a schematic structure diagram of a device for wireless communication according to an embodiment of the disclosure.

FIG. 13 is a schematic block diagram of device for wireless communication 1300 according to an embodiment of the disclosure. As shown in FIG. 13, the equipment 1300 includes: a processor 1310 and a transceiver 1320, and the processor 1310 is connected with the transceiver 1320. Optionally, the equipment 1300 further includes a memory 1330, and the memory 1330 is connected with the processor 1310. Furthermore, the equipment 1300 optionally includes a bus system 1340, wherein the processor 1310, the memory 1330 and the transceiver 1320 may be connected through the bus system 1340, the memory 1330 may be configured to store an instruction, and the processor 1310 may be configured to execute the instruction stored in the memory 1330 to control the transceiver 1320 to send information or a signal.

The processor 1310 is configured to control the transceiver 1320 to receive a first request message sent by terminal equipment in a first time period, the first request message being configured to request the equipment 1300 to set up or resume a radio bearer for the terminal equipment;

the processor 1310 is configured to acquire context information of the terminal equipment according to the first request message, wherein the context information of the terminal equipment is stored in management equipment, the context information of the terminal equipment is sent to the management equipment by second network equipment, and the second network equipment is last network equipment generating or updating the context information of the terminal equipment before the first time period; and the processor 1310 is configured to set up or resume the radio bearer for the terminal equipment according to the context information of the terminal equipment.

Optionally, the first request message is an RRC connection resume request.

Optionally, the processor 1310 is configured to control the transceiver 1320 to send a second request message to the management equipment according to the first request message, the second request message being configured to request the management equipment to send the context information of the terminal equipment to the equipment 1300; and the processor 1310 is configured to control the transceiver 1320 to receive the context information of the terminal equipment from the management equipment.

Optionally, a mapping relationship between an equipment ID of the terminal equipment and the context information of the terminal equipment is stored in the management equipment, wherein an equipment ID is configured to uniquely indicate a piece of terminal equipment, and the processor 1310 is specifically configured to control the transceiver 1320 to send the second request message to the management equipment according to the first request message, the second request message containing the equipment ID of the terminal equipment.

Optionally, the processor 1310 is further configured to control the transceiver 1320 to receive first indication information sent by the terminal equipment, the first indication information being configured to indicate third network equipment, or, the first indication information being configured to indicate a first cell, or the first indication information being configured to indicate whether the third network equipment is the same as the equipment 1300 or not, or the first indication information being configured to indicate whether the first cell is a cell administered by the equipment 1300 or not, wherein the third network equipment is last network equipment performing data transmission with the terminal equipment before the first time period, and the first cell is a cell used for last data transmission of the terminal equipment before the first time period;

the processor 1310 is further configured to determine that the third network equipment and the equipment 1300 are different network equipment according to the first indication information; or the processor 1310 is further configured to determine that the first cell is not a cell administered by the equipment 1300 according to the first indication information.

Optionally, the processor 1310 is further configured to control the transceiver 1320 to receive second indication information sent by the management equipment, the second indication information being configured to indicate the second network equipment, or, the second indication information being configured to indicate whether the second network equipment is the same as the equipment 1300 or not; and the processor 1310 is further configured to determine that the second network equipment and the equipment 1300 are different network equipment according to the second indication information.

Optionally, the processor 1310 is further configured to generate or update the context information of the terminal equipment in a second time period, the second time period being ahead of the first time period; and the processor 1310 is further configured to store the context information of the terminal equipment.

Optionally, the processor 1310 is further configured to control the transceiver 1320 to receive the first indication information sent by the terminal equipment, the first indication information being configured to indicate the third network equipment, or, the first indication information being configured to indicate the first cell, or the first indication information being configured to indicate whether the third network equipment is the same as the equipment 1300 or not, or the first indication information being configured to indicate whether the first cell is a cell administered by the equipment 1300 or not, wherein the third network equipment is the last network equipment performing data transmission with the terminal equipment before the first time period, the first cell is the cell used for last data transmission of the terminal equipment before the first time period, and the processor 1310 is specifically configured to, if it is determined that the third network equipment and the equipment 1300 are the same network equipment according to the first indication information, acquire the context information, stored by the equipment 1300, of the terminal equipment; or the processor 1310 is specifically configured to, if it is determined that the first cell is a cell administered by the equipment 1300 according to the first indication information, acquire the context information, stored by the equipment 1300, of the terminal equipment.

Optionally, the context information of the terminal equipment is stored in the management equipment, the context information of the terminal equipment is sent to the management equipment by the second network equipment, the second network equipment is the last network equipment generating or updating the context information of the terminal equipment before the first time period, and the processor 1310 is further configured to control the transceiver 1320 to receive the second indication information sent by the management equipment, the second indication information being configured to indicate the second network equipment, or, the second indication information being configured to indicate whether the second network equipment is the same as the equipment 1300 or not; and the processor 1310 is specifically configured to, if it is determined that the second network equipment and the equipment 1300 are the same network equipment according to the second indication information, acquire the context information, stored by the equipment 1300, of the terminal equipment.

Optionally, the processor 1310 is further configured to update the context information of the terminal equipment in a third time period, the third time period being located after the first time period; and the processor 1310 is further configured to control the transceiver 1320 to send the updated context information of the terminal equipment to the management equipment.

The device for wireless communication 1300 according to the embodiment of the disclosure may correspond to the first network equipment (for example, the base station #B) in the method of the embodiments of the disclosure, and moreover, each unit, i.e., module, in the device for wireless communication 1300 and the abovementioned and other operations and/or functions are adopted to implement the corresponding flows in the method 200 in FIG. 2 and will not be elaborated herein for simplicity.

According to the device for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

Figure 14:
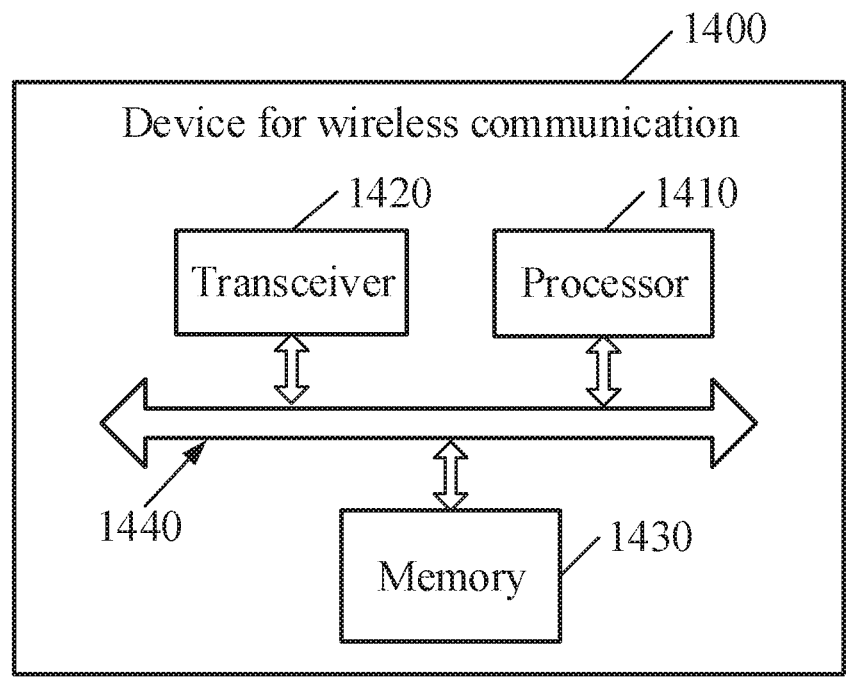
FIG. 14 is a schematic structure diagram of a device for wireless communication according to another embodiment of the disclosure.

FIG. 14 is a schematic block diagram of device for wireless communication 1400 according to another embodiment of the disclosure. As shown in FIG. 14, the equipment 1400 includes: a processor 1410 and a transceiver 1420, and the processor 1410 is connected with the transceiver 1420. Optionally, the equipment 1400 further includes a memory 1430, and the memory 1430 is connected with the processor 1410. Furthermore, the equipment 1400 optionally includes a bus system 1440, wherein the processor 1410, the memory 1430 and the transceiver 1420 may be connected through the bus system 1440, the memory 1430 may be configured to store an instruction, and the processor 1410 may be configured to execute the instruction stored in the memory 1430 to control the transceiver 1420 to send information or a signal.

The processor 1410 is configured to control the transceiver 1420 to receive context information of terminal equipment from second network equipment, the second network equipment being last network equipment generating or updating the context information of the terminal equipment before a first time period;

the processor 1410 is configured to control the transceiver 1420 to receive a second request message sent by first network equipment, the second request message being configured to request the equipment 1400 to transmit the context information of the terminal equipment to the first network equipment, the second request message being sent by the first network equipment according to a first request message received from the terminal equipment in the first time period and the first request message being configured to request the first network equipment to set up or resume a radio bearer for the terminal equipment; and the processor 1410 is configured to control the transceiver 1420 to send the context information of the terminal equipment to the first network equipment according to the second request message.

Optionally, the processor 1410 is specifically configured to control the transceiver 1420 to receive the context information of the terminal equipment and an equipment ID of the terminal equipment from the second network equipment, an equipment ID being configured to uniquely indicate a piece of terminal equipment, and the processor 1410 is specifically configured to store indication information of a mapping relationship between the equipment ID of the terminal equipment and the context information of the terminal equipment in the memory 1430;

the processor 1410 is specifically configured to control the transceiver 1420 to receive the second request message sent by the first network equipment, the second request message containing the equipment ID of the terminal equipment; and the processor 1410 is further specifically configured to determine the context information of the terminal equipment according to the equipment ID, contained in the second request message, of the terminal equipment based on the indication information, stored by the memory 1430, of the mapping relationship between the equipment ID of the terminal equipment and the context information of the terminal equipment.

Optionally, the processor 1410 is further configured to control the transceiver 1420 to send second indication information to the first network equipment, the second indication information being configured to indicate the second network equipment, or, the second indication information being configured to indicate whether the second network equipment is the same as the first network equipment or not.

Optionally, the processor 1410 is further configured to control the transceiver 1420 to receive updated context information of the terminal equipment from the first network equipment.

The device for wireless communication 1400 according to the embodiment of the disclosure may correspond to the management equipment (for example, the MME) in the method of the embodiments of the disclosure, and moreover, each unit, i.e., module, in the device for wireless communication 1400 and the abovementioned and other operations and/or functions are adopted to implement the corresponding flows in the method 600 in FIG. 6 and will not be elaborated herein for simplicity.

According to the device for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

Figure 15:
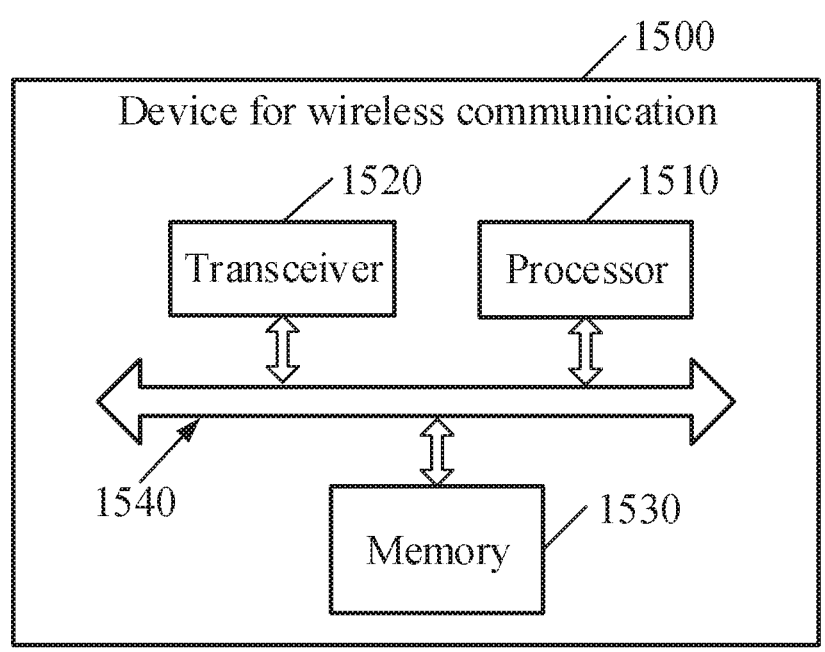
FIG. 15 is a schematic structure diagram of a device for wireless communication according to still another embodiment of the disclosure.

FIG. 15 is a schematic block diagram of device for wireless communication 1500 according to another embodiment of the disclosure. As shown in FIG. 15, the equipment 1500 includes: a processor 1510 and a transceiver 1520, and the processor 1510 is connected with the transceiver 1520. Optionally, the equipment 1500 further includes a memory 1530, and the memory 1530 is connected with the processor 1510. Furthermore, the equipment 1500 optionally includes a bus system 1540, wherein the processor 1510, the memory 1530 and the transceiver 1520 may be connected through the bus system 1540, the memory 1530 may be configured to store an instruction, and the processor 1510 may be configured to execute the instruction stored in the memory 1530 to control the transceiver 1520 to send information or a signal.

The processor 1510 is configured to generate or update context information of the terminal equipment; and the processor 1510 is configured to control the transceiver 1520 to send the context information of the terminal equipment to management equipment.

Optionally, the processor 1510 is specifically configured to control the transceiver 1520 to send the context information of the terminal equipment and an equipment ID of the terminal equipment to the management equipment, wherein an equipment ID is configured to uniquely indicate a piece of terminal equipment.

The device for wireless communication 1500 according to the embodiment of the disclosure may correspond to the second network equipment (for example, the network equipment #A) in the method of the embodiments of the disclosure, and moreover, each unit, i.e., module, in the device for wireless communication 1500 and the abovementioned and other operations and/or functions are adopted to implement the corresponding flows in the method 700 in FIG. 7 and will not be elaborated herein for simplicity.

According to the device for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

Figure 16:
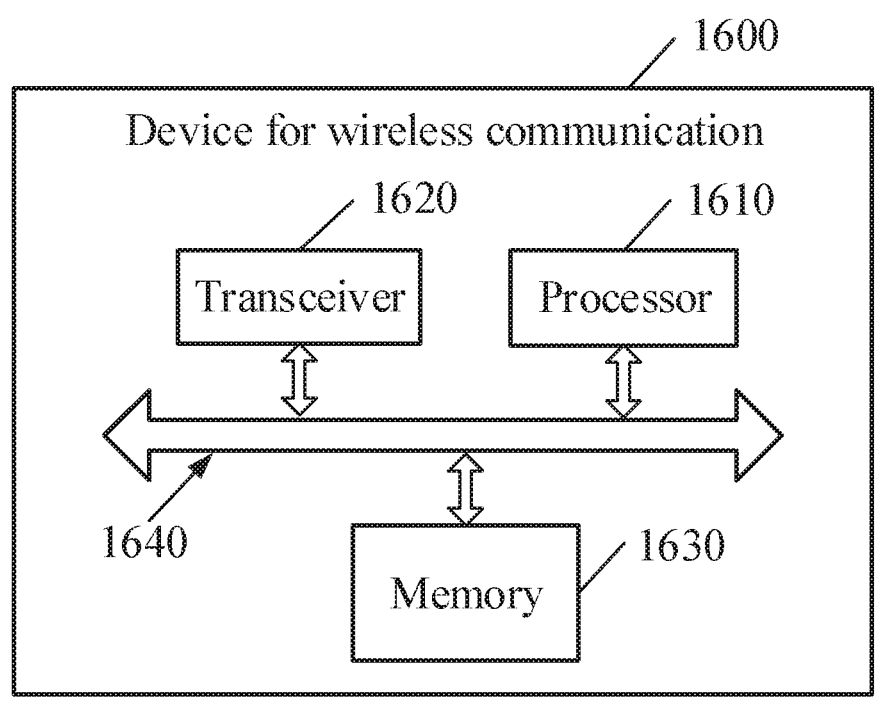
FIG. 16 is a schematic structure diagram of a device for wireless communication according to yet another embodiment of the disclosure.

FIG. 16 is a schematic block diagram of device for wireless communication 1600 according to another embodiment of the disclosure. As shown in FIG. 16, the equipment 1600 includes: a processor 1610 and a transceiver 1620, and the processor 1610 is connected with the transceiver 1620. Optionally, the equipment 1600 further includes a memory 1630, and the memory 1630 is connected with the processor 1610. Furthermore, the equipment 1600 optionally includes a bus system 1640, wherein the processor 1610, the memory 1630 and the transceiver 1620 may be connected through the bus system 1640, the memory 1630 may be configured to store an instruction, and the processor 1610 may be configured to execute the instruction stored in the memory 1630 to control the transceiver 1620 to send information or a signal.

The processor 1610 is configured to control the transceiver 1620 to send a first request message to first network equipment in a first time period, the first request message being configured to request the first network equipment to set up or resume a radio bearer for the equipment 1600, to enable the first network equipment to acquire context information of the equipment 1600 according to the first request message, wherein the context information of the equipment 1600 is stored in management equipment, the context information of the equipment 1600 is sent to the management equipment by second network equipment, and the second network equipment is last network equipment generating or updating the context information of the equipment 1600 before the first time period.

Optionally, the processor 1610 is further configured to control the transceiver 1620 to send first indication information to the first network equipment, the first indication information being configured to indicate third network equipment, or, the first indication information being configured to indicate a first cell, or the first indication information being configured to indicate whether the third network equipment is the same as the first network equipment or not, or the first indication information being configured to indicate whether the first cell is a cell administered by the first network equipment or not, wherein the third network equipment is last network equipment performing data transmission with the equipment 1600 before the first time period, and the first cell is a cell used for last data transmission of the equipment 1600 before the first time period.

The device for wireless communication 1600 according to the embodiment of the disclosure may correspond to the terminal equipment (for example, the terminal equipment #A) in the method of the embodiments of the disclosure, and moreover, each unit, i.e., module, in the device for wireless communication 1600 and the abovementioned and other operations and/or functions are adopted to implement the corresponding flows in the method 800 in FIG. 8 and will not be elaborated herein for simplicity.

According to the device for wireless communication of the embodiment of the disclosure, the second network equipment sends the context information of the terminal equipment to the management equipment after generating or updating the context information of the terminal equipment, and then the first network equipment may acquire the context information of the terminal equipment from the management equipment and use the context information of the terminal equipment to set up or resume the radio bearer for the terminal equipment based on the context information of the terminal equipment to provide communication service for the terminal equipment, that is, when the terminal equipment is required to be handed over from the second network equipment to the first network equipment, signaling interaction between the first network equipment and the second network equipment may be avoided, so that a transmission resource and signaling overhead may be reduced, and network construction cost may be reduced.

It is important to note that the method embodiment of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor or the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an EPROM, an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is important to note that the memory of a system and method described in the disclosure is intended to include, but not limited to, memories of these and any other proper types.

It should be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
  receiving, by a first network equipment, a first request message sent by a terminal equipment in a first time period, wherein the first request message is a Radio Resource Control (RRC) connection resume request and is configured to request the first network equipment to set up or resume a radio bearer for the terminal equipment;
  acquiring, by the first network equipment, context information of the terminal equipment according to the first request message, wherein the first request message is configured to directly trigger the first network equipmentdevice to acquire the context information of the terminal equipment and the context information of the terminal equipment is stored in a management equipment, the context information of the terminal equipment is sent to the management equipment by a second network equipment, and the second network equipment is a last network equipment generating or updating the context information of the terminal equipment before the first time period; and setting up or resuming, by the first network equipment, the radio bearer for the terminal equipment according to the context information of the terminal equipment;

wherein acquiring, by the first network equipment, the context information of the terminal equipment according to the first request message comprises:

sending, by the first network equipment, a second request message to the management equipment according to the first request message, the second request message being configured to request the management equipment to send the context information of the terminal equipment to the first network equipment; and receiving, by the first network equipment, the context information of the terminal equipment from the management equipment, and wherein the management equipment is not a Mobility Managing Entity (MME), wherein a mapping relationship between equipment Identifiers (IDs) of different terminal equipment and the context information of the terminal equipment is stored in the management equipment, wherein each of the equipment IDs is configured to uniquely indicate one terminal equipment, and the mapping relationship is determined by the management equipment based on the context information of the terminal equipment and the equipment IDs of the different terminal equipment that are sent to the management equipment from the second network equipment, wherein the second request message comprises the equipment ID of the terminal equipment, wherein before sending, by the first network equipment, the second request message to the management equipment according to the first request message, the method further comprises:

receiving, by the first network equipment, first indication information sent by the terminal equipment, the first indication information being configured to indicate whether a third network equipment is the same as the first network equipment or not, wherein the third network equipment is a last network equipment performing data transmission with the terminal equipment before the first time period; and determining, by the first network equipment, that the third network equipment is different from the first network equipment according to the first indication information, wherein the method further comprises:

updating, by the first network equipment, the context information of the terminal equipment in a third time period, the third time period being after the first time period; and sending, by the first network equipment, the updated context information of the terminal equipment to the management equipment.

2. The method according to claim 1, further comprising:

generating or updating, by the first network equipment, the context information of the terminal equipment in a second time period, the second time period being ahead of the first time period; and storing, by the first network equipment, the context information of the terminal equipment.

3. A device for wireless communication, comprising:

a processor;

a memory configured to store instructions executable by the processor; and a transceiver connected with the processor, wherein the processor is configured to execute the instructions stored in the memory to:

control the transceiver to receive a first request message sent by a terminal equipment in a first time period, the first request message being configured to request the device to set up or resume a radio bearer for the terminal equipment;

acquire context information of the terminal equipment according to the first request message, wherein the first request message is configured to directly trigger the device to acquire the context information of the terminal equipment and the context information of the terminal equipment is stored in a management equipment, the context information of the terminal equipment is sent to the management equipment by a second network equipment, and the second network equipment is a last network equipment generating or updating the context information of the terminal equipment before the first time period; and set up or resume the radio bearer for the terminal equipment according to the context information of the terminal equipment;

wherein the processor is specifically configured to control the transceiver to send a second request message to the management equipment according to the first request message, the second request message being configured to request the management equipment to send the context information of the terminal equipment to the device, and control the transceiver to receive the context information of the terminal equipment from the management equipment, and wherein the management equipment is not a Mobility Managing Entity (MME), wherein a mapping relationship between equipment Identifiers (IDs) of different terminal equipment and the context information of the terminal equipment is stored in the management equipment, wherein each of the equipment IDs is configured to uniquely indicate one terminal equipment, and the mapping relationship is determined by the management equipment based on the context information of the terminal equipment and the equipment IDs of the different terminal equipment that are sent to the management equipment from the second network equipment, and the processor is specifically configured to control the communication unit to send the second request message comprising the equipment ID of the terminal equipment to the management equipment according to the first request message, wherein the first request message is a Radio Resource Control (RRC) connection resume request, wherein the processor is further configured to control the transceiver to receive first indication information sent by the terminal equipment, the first indication information being configured to indicate whether the third network equipment is the same as the device or not, wherein the third network equipment is a last network equipment performing data transmission with the terminal equipment before the first time period; and the processor is further configured to determine that the third network equipment is different from the device according to the first indication information, wherein the processor is further configured to update the context information of the terminal equipment in a third time period, the third time period being after the first time period; and the processor is further configured to control the transceiver to send the updated context information of the terminal equipment to the management equipment.

4. The device according to claim 3, wherein the processor is further configured to generate or update the context information of the terminal equipment in a second time period, the second time period being ahead of the first time period; and the memory is further configured to store the context information of the terminal equipment.

5. The device according to claim 4, wherein the processor is specifically configured to, in responsive to determining that the third network equipment is the same as the device according to the first indication information, acquire the context information of the terminal equipment from the memory.

6. A device for wireless communication, comprising:
a processor;
a memory configured to store instructions executable by the processor; and
a transceiver connected with the processor, wherein the processor is configured to execute the instructions stored in the memory to:
control the transceiver to send a first request message to a first network equipment in a first time period, wherein the first request message is a Radio Resource Control (RRC) connection resume request and is configured to request the first network equipment to set up or resume a radio bearer for the device, to enable the first network equipment to send a second request message comprising equipment ID of the terminal equipment to a management equipment to acquire context information of the device according to the first request message, wherein the first request message being configured to directly trigger the first network equipment to acquire the context information of the terminal equipment, the second request message being configured to request the management equipment to send the context information of the terminal equipment to the first network equipment, the context information of the device is stored in the management equipment, the context information of the device is sent to the management equipment by a second network equipment, and the second network equipment is a last network equipment generating or updating the context information of the device before the first time period, wherein the management equipment is not a Mobility Managing Entity (MME), wherein a mapping relationship between equipment Identifiers (IDs) of different terminal equipment and the context information of the terminal equipment is stored in the management equipment, wherein each of the equipment IDs is configured to uniquely indicate one terminal equipment, and the mapping relationship is determined by the management equipment based on the context information of the terminal equipment and the equipment IDs of the different terminal equipment that are sent to the management equipment from the second network equipment, wherein the processor is further configured to control the transceiver to send first indication information to the first network equipment, the first indication information being configured to indicate whether the third network equipment is the same as the first network equipment or not, wherein the third network equipment is a last network equipment performing data transmission with the device before the first time period, wherein the context information of the device is updated by the first network equipment in a third time period after the first time period, and the updated context information of the device is sent to the management equipment by the first network equipment.

* * * * *